US012459143B2

(12) United States Patent
Galanis et al.

(10) Patent No.: US 12,459,143 B2
(45) Date of Patent: Nov. 4, 2025

(54) SHAVING HEAD

(71) Applicant: BIC VIOLEX S.A., Anoixi (GR)

(72) Inventors: Christos Galanis, Anoixi (GR); Christos Ampatis, Anoixi (GR); Charalampos Schizas, Anoixi (GR); Ioannis Komianos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 358 days.

(21) Appl. No.: 17/643,281

(22) Filed: Dec. 8, 2021

(65) Prior Publication Data

US 2022/0193939 A1 Jun. 23, 2022

(30) Foreign Application Priority Data

Dec. 21, 2020 (EP) .................................... 20216154

(51) Int. Cl.

*B26B 21/40* (2006.01)
*B26B 21/22* (2006.01)
*B26B 21/06* (2006.01)

(52) U.S. Cl.

CPC ...... *B26B 21/4062* (2013.01); *B26B 21/4031* (2013.01); *B26B 21/4068* (2013.01); *B26B 21/06* (2013.01); *B26B 21/225* (2013.01)

(58) Field of Classification Search

CPC ....... B26B 21/08; B26B 21/14; B26B 21/165; B26B 21/185; B26B 21/227; B26B 21/4018; B26B 21/4025; B26B 21/4031; B26B 21/4037; B26B 21/4043; B26B 21/4062; B26B 21/30; B26B 21/12; B26B 21/06; B26B 21/4012; B26B 21/225; B26B 21/4068

USPC .............................................................. 30/50

See application file for complete search history.

(56) References Cited

U.S. PATENT DOCUMENTS 3,955,277 A 5/1976 Pomfret
4,345,374 A 8/1982 Jocobson
4,461,079 A 7/1984 Ciaffone et al.
5,313,706 A 5/1994 Motta et al.
6,243,951 B1 * 6/2001 Oldroyd .............. B26B 21/4018 30/34.2

(Continued)

FOREIGN PATENT DOCUMENTS

EP 20208191.5 5/2024
WO 9504637 A1 2/1995

(Continued)

OTHER PUBLICATIONS

Extended European search report in European Application No. 20216154.3, dated May 31, 2021 (7 pages).

*Primary Examiner* — Adam J Eiseman
*Assistant Examiner* — Robert D Cornett
(74) *Attorney, Agent, or Firm* — Bookoff McAndrews, PLLC

(57) ABSTRACT

The present disclosure pertains to a shaving head comprising a frame and one or more cutting members arranged between a leading longitudinal side and a trailing longitudinal side of the frame. One or more of the cutting members are movable in a direction orthogonal to a shaving plane. The shaving head comprises an actuator member, which is configured to retract one or more cutting members relative to the shaving plane in response to a pressure exerted on the actuator member.

16 Claims, 16 Drawing Sheets

(56) References Cited

U.S. PATENT DOCUMENTS

| | | | | |
|---|---|---|---|---|
| 8,336,212 | B2 * | 12/2012 | Bozikis | B26B 21/227 30/50 |
| 2003/0159291 | A1 | 8/2003 | Clark | |
| 2007/0056167 | A1 * | 3/2007 | Richard | B26B 21/227 30/50 |
| 2011/0308089 | A1 * | 12/2011 | Bridges | B26B 21/4018 30/84 |
| 2012/0324737 | A1 * | 12/2012 | Howell | B26B 21/4018 30/50 |
| 2017/0341247 | A1 * | 11/2017 | Zafiropoulos | B26B 21/227 |
| 2019/0016001 | A1 | 1/2019 | Zucker | |

FOREIGN PATENT DOCUMENTS

| | | | |
|---|---|---|---|
| WO | 0139937 | A1 | 6/2001 |
| WO | 2006027018 | A1 | 3/2006 |
| WO | 2019141488 | A1 | 7/2019 |
| WO | 2020008037 | A2 | 1/2020 |

* cited by examiner

SHAVING HEAD

This application claims benefit from European patent application EP20216154.3, filed on 21 Dec. 2020, its content being incorporated herein by reference.

TECHNICAL FIELD

The present disclosure relates to the field of a shaving head, in particular a shaving head having an actuator member.

TECHNICAL BACKGROUND

Shaving heads or razor cartridges are permanently or removably attached to a razor handle that, in use, is oriented in shaving direction. Razor cartridges typically comprise one or more cutting members, each supporting a blade, mounted perpendicular to the shaving direction. Razor cartridges are also typically provided with a guard (at a leading longitudinal side of the razor cartridge in the shaving direction) and a cap (at a trailing longitudinal side of the razor cartridge in the shaving direction). A skin care element is also often provided at the trailing longitudinal side. In use, a user holds the razor handle in the shaving direction and brings the razor cartridge into contact with a portion of skin defining a shaving plane. The shaving plane may be approximated as a line between the highest points on the skin-contacting surfaces of a shaving head—for example, the flat plane between the top of a guard and the top of a cap of the shaving head. Movement of the razor handle causes the blades of the shaving head to be moved across the shaving plane in the shaving direction, enabling the blades to remove unwanted hair.

The objective of the present disclosure is to improve the performance of a shaving head.

SUMMARY

In a first aspect, the present disclosure relates to a shaving head comprising a frame and one or more cutting members arranged between a leading longitudinal side and a trailing longitudinal side of the frame. One or more of the cutting members are movable in a direction orthogonal to a shaving plane. The shaving head further comprises an actuator member, which is configured to retract one or more cutting members relative to the shaving plane in response to a pressure exerted on the actuator member.

The actuator member may comprise a pressure sensor element. The pressure sensor element may comprise one or more comb teeth. The pressure sensor element or one or more of the comb teeth may extend above the shaving plane in an "at-rest" condition without any force acting on the actuator member. One or more of the comb teeth may extend about 0.05 mm to about 3.0 mm, in particular about 0.1 mm to about 1.0 mm, more particularly about 0.3 mm to about 0.5 mm above the shaving plane. The pressure sensor element or one or more of the comb teeth may substantially be at the same level with the shaving plane in an "at-rest" condition without any force acting on the actuator member.

The pressure sensor element of the actuator member may be elastically supported in the shaving head. The pressure sensor element may be a longitudinal element having a continuous geometry in the longitudinal direction or may comprise a comb-like geometry in the longitudinal direction. The pressure sensor element may be a non-cutting element or be one of the one or more cutting members. The pressure sensor element may be arranged between the leading longitudinal side of the frame and one or more of the cutting members, in particular between the leading longitudinal side of the frame and the leading cutting member. The pressure sensor element may be arranged between the trailing longitudinal side of the frame and one or more of the cutting members, in particular between the trailing longitudinal side of the frame and the trailing cutting member. The pressure sensor element may be configured to generate a force for decreasing the exposure of one or more of the cutting members. The shaving head may comprise two or more pressure sensor elements.

The actuator member may comprise one or more cantilever elements, which are configured to transmit a force from the pressure sensor element to one or more of the cutting members. The one or more cantilever elements may be connected to the pressure sensor element. One or more of the cutting members may comprises a blade and a blade support, wherein one or more cantilever elements contact the blades and/or the blade supports. One or more of the cutting members may comprises one or more apertures, wherein at least one of the cantilever elements extends through at least one of the apertures. The one or more apertures of a cutting member may be in the blade support of the cutting member.

One or more of the cantilever elements may be connected to one or more of the cutting members. One or more of the cantilever elements may be connected to the frame. One or more cantilever elements may be connected to the frame at a position proximate to the leading longitudinal side of the frame or at a position proximate to the trailing longitudinal side of the frame. One or more cantilever elements may be connected proximate to the trailing longitudinal side of the frame and one or more pressure sensor elements may be positioned proximate to the leading longitudinal side of the frame. Alternatively or in addition, one or more cantilever elements may be connected proximate to the leading longitudinal side of the frame and one or more pressure sensor elements may be positioned proximate to the trailing longitudinal side of the frame.

One or more cantilever elements may elastically support the pressure sensor element in the shaving head. One or more of the cutting members may be retained by one or more cantilever elements. One or more cantilever elements may comprise side extensions. One or more cantilever elements may be secured to the frame by or with the side extensions of the cantilever element. The side extensions of the one or more cantilever elements may be secured by clips or retainers to the frame. The side extensions of the one or more cantilever elements itself may function as clips or retainers for securing the actuator member to the frame. The cantilever element may function as blade retainer, securing the blades in the housing.

The actuator member may comprise aluminum, in particular one or more of the cantilever elements may comprise aluminum.

The actuator member may be configured to produce progressively increasing or progressively decreasing exposures of the cutting edges of a plurality of cutting members. The actuator member may be configured to bend one or more of the cutting members.

The actuator member may comprise an elastic material, in particular a metallic and/or a polymeric and/or composite material.

The shaving head may comprise a plurality of actuator members.

One or more of the cutting members may be positioned in a blade receiving section of the frame. One or more of the cutting members may be positioned on resilient fingers. One or more of the cutting members may be retained by retainers. One or more of the cutting members may comprise a blade only or a blade and a blade support.

In a second aspect, the present disclosure relates to a method of manufacturing a shaving head comprising, in any order, one or more of the following steps. Obtaining a frame, one or more cutting members and an actuator member. Disposing the one or more cutting members between a leading longitudinal side and a trailing longitudinal side of the frame such that one or more of the cutting members are movable in a direction orthogonal to a shaving plane. Disposing an actuator member in the frame such that it is configured to retract one or more cutting members relative to the shaving plane in response to a pressure exerted on the actuator member. The actuator member may comprise a pressure sensor element and a cantilever element.

In a third aspect, the present disclosure relates to a shaving razor assembly comprising a razor handle and a shaving head in accordance with any of the embodiments summarized above. The shaving head may either releasably attached to the razor handle via a pivotable or non-pivotable connection, integrally formed with the razor handle via a non-pivotable connection, or integrally formed with the razor handle via a pivotable connection.

In a fourth aspect, the present disclosure relates to a kit of parts comprising a razor handle a shaving head holder comprising a plurality of shaving heads according to any of the embodiments summarized above.

BRIEF DESCRIPTION OF THE DRAWINGS

Additional details and features of the disclosure are described with reference to the following figures in which.

DETAILED DESCRIPTION

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Figure 1:
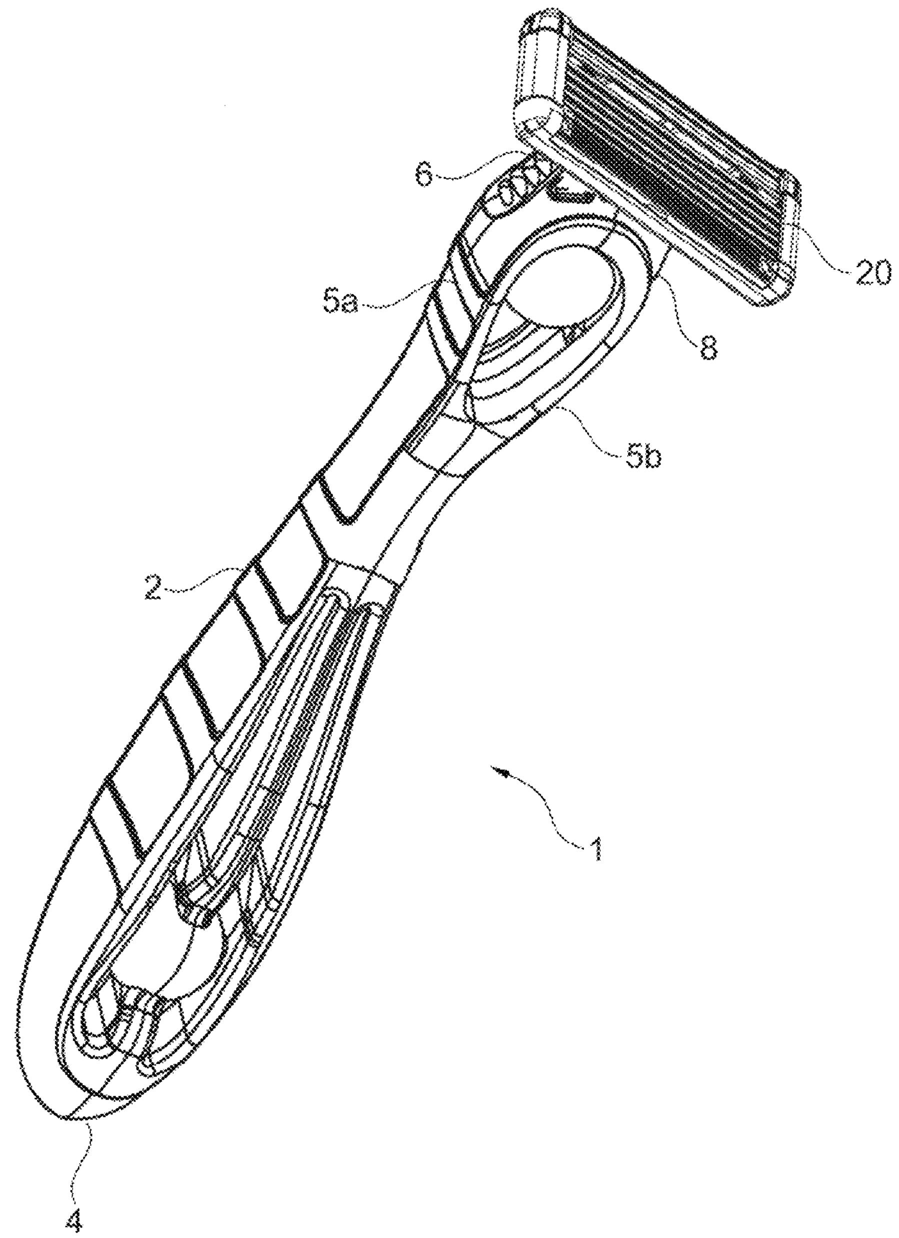
FIG. 1 shows a shaving razor assembly.

FIG. 1 is a perspective view of a shaving razor assembly 1. The shaving razor assembly is only shown for illustrative purposes and is not intended to be limiting the present disclosure. The shaving razor assembly 1 comprises a handle 2 with a proximal portion 4 and a distal portion 6. A shaving head or razor cartridge 20 is mounted at the distal portion 6 of the handle 2. The shaving head 20 comprises a frame and cutting members and will be presented in more detail following discussion of the shaving razor assembly 1. The mounting of the shaving head 20 to the distal portion 6 of the handle 2 in the illustration is via a pivotable bearing member 8 enabling a frame of reference of the handle 2 to vary relative to a frame of reference of the shaving head 20, to thus enable the angle of the razor cartridge against the skin of a user to vary and adapt to changes during use. In particular, the shaving head 20 pivots relative to the handle 2 about the longitudinal axis L of the shaving head 20, in use. The pivoting enables the user to adapt to contours of the body, for example. The longitudinal axis L of the shaving head 20 is substantially perpendicular to the shaving direction along the handle 2. Another example of a connection mechanism for connecting the shaving head 20 to the handle 2 is discussed in WO2006/027018 A1. In examples, a shaving head 20 may pivot relative to a second pivot axis (a rocking axis), substantially perpendicular to axis L. In examples, the pivotable bearing member 8 may be omitted (not illustrated) and the handle 2 provided as an integrally connected part of the support of the shaving head 20. In an example, the pivotable bearing member 8 may further comprise, or be replaced by, a release mechanism 5*a*, 5*b*, enabling rapid release of an exhausted razor cartridge from the handle 2. In an example, the handle 2 and the support of the shaving head 20 are integrally formed with a pivotable bearing member (not illustrated) such as a plastic spring member. In an example, the handle 2 is provided with a handle grip formed of a rubber, or rubber-like material to improve gripping friction.

Figure 2A:
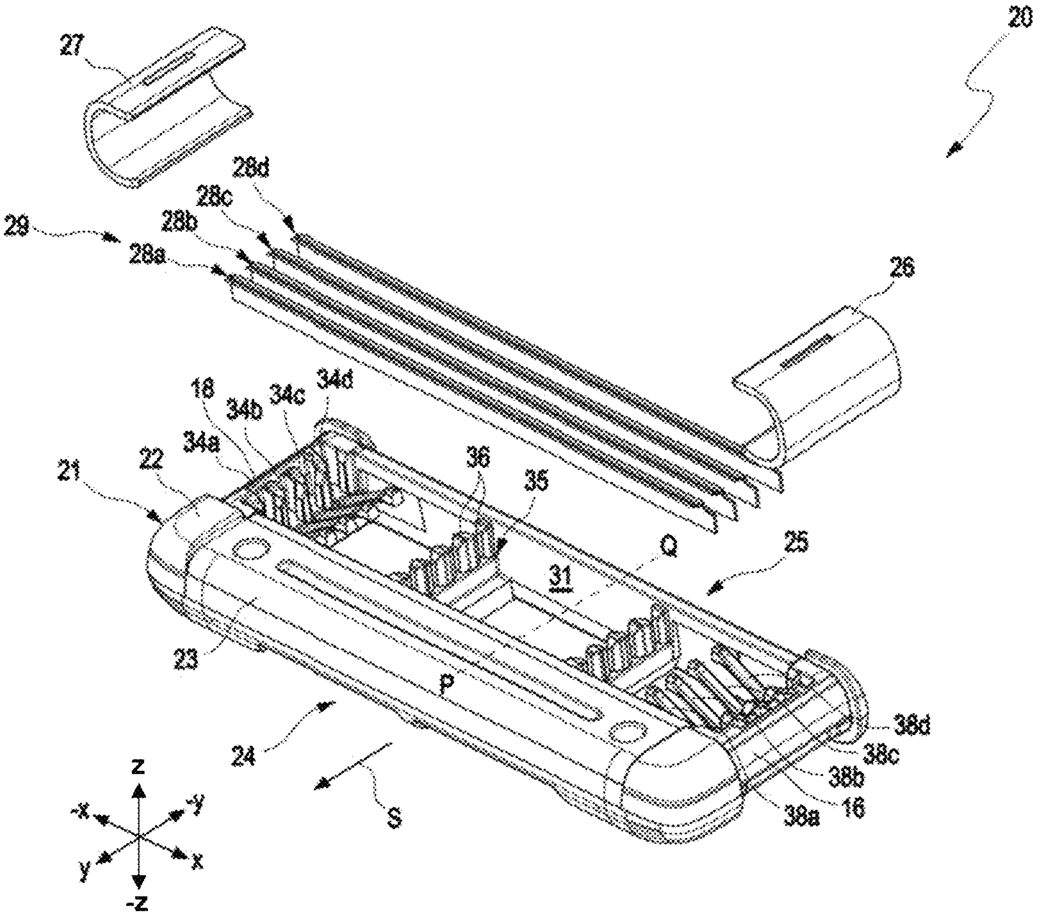
FIGS. 2*a-b* show an exploded-view drawing of a shaving head and a cross-section through the shaving head along line P-Q of FIG. 2*a;*
Figure 2B:
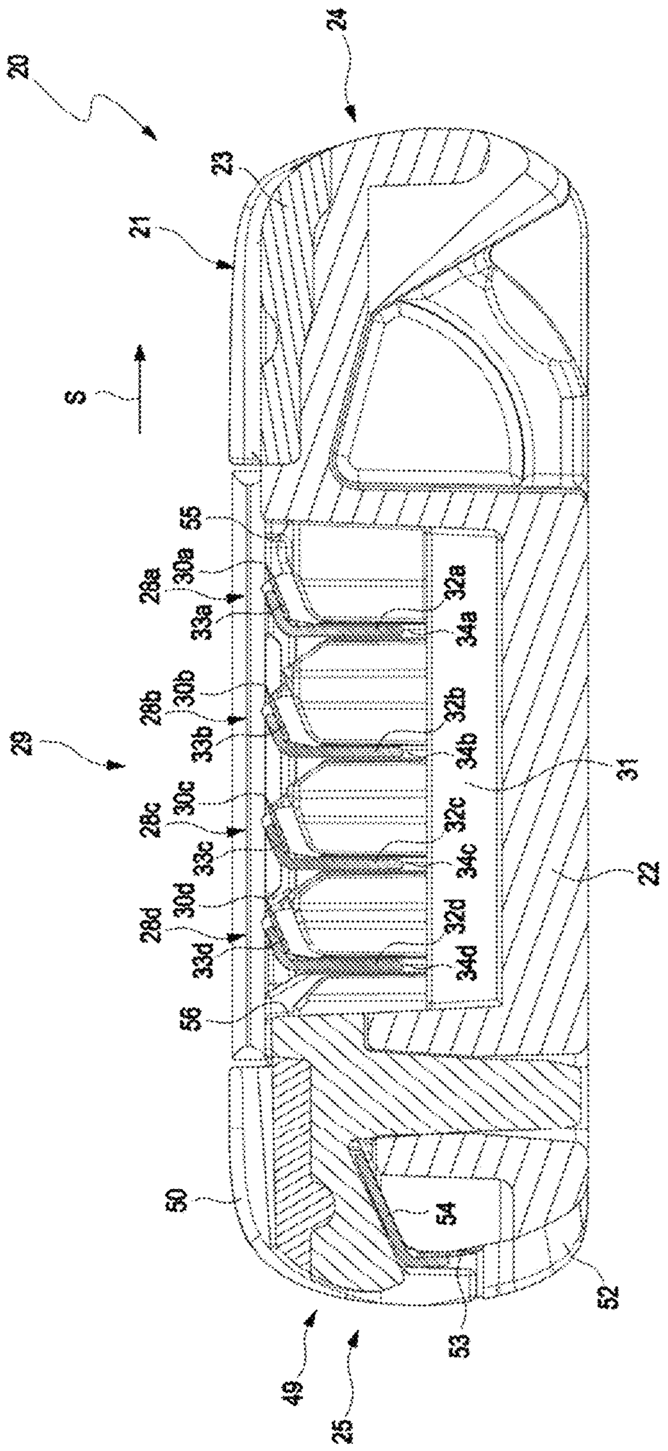

FIGS. 2*a*-2*b* show details of an exemplary shaving head 20, which is not intended to limit the present disclosure. FIG. 2*a* is a perspective partial exploded view of a shaving head 20. FIG. 2*b* is a schematic cutaway side view of a razor cartridge taken from the embodiment of FIG. 2*a* along transverse axis P-Q illustrated by the dotted line in FIG. 2*a*. "Partial exploded view" means that some minor components of the shaving head 20 have been omitted from the exploded view to aid clarity of the drawing.

The shaving direction S is depicted in FIG. 2*a*-*b* using arrow S. In use, the shaving head 20 contacts a shaving plane SH (not shown in FIG. 2*a*-*b*), and is translated across the shaving plane SH in the direction of arrow S. The shaving plane may be approximated as a line between the highest points on the skin-contacting surfaces of a shaving head—for example, the flat plane between the top of a guard and the top of a cap of the shaving head. Movement of the razor handle causes the blades of the shaving head to be moved across the shaving plane in the shaving direction, enabling the blades to remove unwanted hair.

The shaving head comprises a frame 21, which may be fabricated partially or completely of synthetic materials, such as plastic, resin, or elastomers. The frame 21 may comprise a platform member connectable to a handle 2 of a shaving razor assembly 1 either integrally, or by a connection mechanism such as a pivotable bearing member 8 or by an interconnecting member (not shown). The frame is configured to house the cutting members and may comprise additional elements, such as retainers, guard members or the like.

The shaving head may also comprise a guard member 23, which may be provided as a substantially longitudinal edge of the shaving head 20. The guard member 23 may be a separate part attached to the frame or it may be a portion of the frame. In use, the guard member 23 is the first portion of the shaving head 20 to contact uncut hairs, and it is thus located at a leading longitudinal side 24 of the shaving head 20. The side of the shaving head 20 opposite to the leading longitudinal side of the shaving head 20 and opposite to the shaving direction is the trailing longitudinal side 25 of the shaving head 20. The trailing longitudinal side 25 is thus the final portion of the shaving head 20 to contact the shaving plane SH, in use. It will be noted that the terms "leading longitudinal side 24" and "trailing longitudinal side 25" are used to denote specific locations on the shaving head 20, and do not imply or require the absence or presence of a particular feature. For example, a guard member 23 may in one example be located at the "leading longitudinal side 24", and in another example a trimming blade (not shown in FIG. 2) may be located at the "trailing longitudinal side 25" in another example, but it is not essential that these locations comprise such features.

The guard member 23, in an example, comprises an elastomeric member (not shown in FIG. 2). In an example, the elastomeric layer comprises one or more fins extending longitudinally in parallel to the guard member 23 and substantially perpendicularly to the shaving direction. One purpose of such an elastomeric layer is, for example, to tension the skin prior to cutting.

The shaving head 20 may, in embodiments, further comprise a cap member at, or near to, the trailing longitudinal side 25 but this is not illustrated in the embodiment of FIG. 2 as an aid to clarity.

The shaving head 20 further comprises one or more cutting members, in particular a group of cutting members 29 accommodated in a blade receiving section 31 of the frame 21. The group of cutting members 29 comprises a plurality of cutting members 28*a*-*d*. The group of cutting members 29 may be disposed in the frame 21 longitudinally and parallel to the shaving direction SH such that in use, blades of the cutting members 28*a*-*d* contact a shaving plane SH and cut hair present on the shaving plane SH as the shaving head 20 is moved across the shaving plane SH in the shaving direction S. The particular design of the group cutting members 29 will be discussed in detail subsequently but is not intended to be limiting. In an example, a razor cartridge is provided with three cutting members. In an example, a razor cartridge is provided with four cutting members. In an example, a razor cartridge is provided with five cutting members. In an example, a razor cartridge is provided with six cutting members. In an example, a razor cartridge is provided with seven or more cutting members.

The frame 21 may further comprise first retainer 26 and second retainer 27 configured to hold the razor blades within shaving head 20 housing. Such retainers, however, may not be necessary and the blades may be secured in position by other fasteners e.g., the actuator member as discussed below with reference to FIGS. 6 and 7. The frame 21 further comprises first 16 and second 18 side portions. When the shaving head 20 is in an assembled state, the first and second side portions 16, 18 may be configured to fixedly confine the longitudinal ends of the guard member 23, a cap member 29 (if present, not shown in FIG. 2) and the group of cutting members 29. The first side retainer 26 and second retainer 27 may comprise, for example, plastic, an elastomer, or a metal material and furthermore may be of a different shape to that illustrated.

Although not illustrated, a pivotable bearing member may, in an example be provided on the side of the shaving head 20 configured to connect to a pivotable handle 2. Such a pivotable bearing member, in an example, comprises two or more shell bearings configured to connect to the pivotable bearing member of the handle 2.

Each cutting member 28*a*-*d* in the group of cutting members 29 may comprises a longitudinal blade support 32*a*-*d*. A longitudinal blade is mounted on the blade support 32*a*-*d*. The cutting edge 30*a*-*d* of a cutting member 28*a*-*d* is oriented forward in the direction of shaving S. The blade support 32*a*-*d* of a cutting member 28*a*-*d* may be an elongated, bent piece of rigid material. In an example, the blade support 32 is a metal such as austenitic stainless steel.

Figure 13:
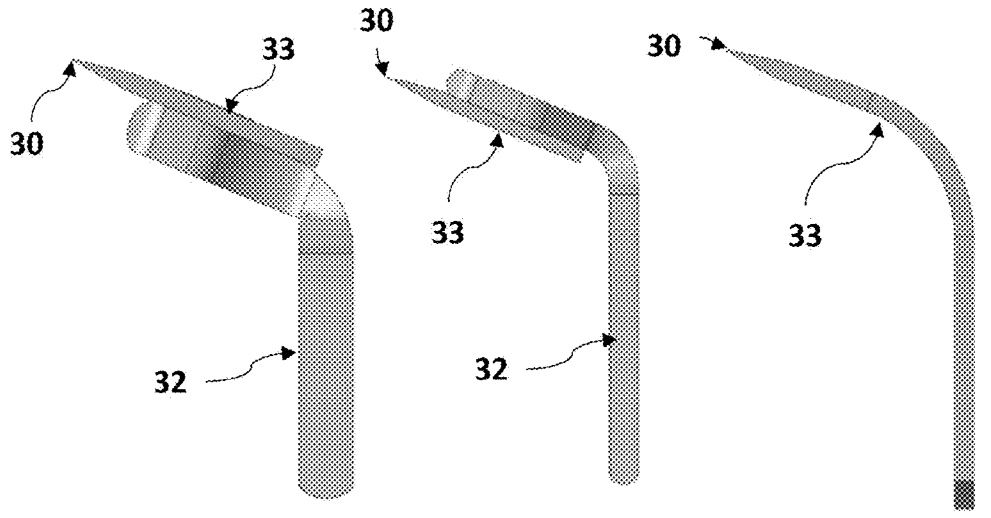
FIG. 13 shows examples of different cutting members.

The present disclosure is not limited to a specific shape or design of one or more cutting members. To the contrary, the concept of the present disclosure is applicable for all kinds of cutting members. Examples of cutting members are shown FIG. 13. On the left of FIG. 13, a cutting member 28 comprises a blade support 32 and a blade 33 having a cutting edge 30. The blade support 32 is shown as being a bent blade support but this is not intended to be limiting. The blade support could also be a straight blade support. The blade 33 of this example is shown to be positioned on a top surface of the blade support 32. As can be seen in the middle of FIG. 13, the blade 33 can also be positioned on a bottom surface of the blade support 32. The example on the right of FIG. 13 shows a cutting member which does not comprise a blade support 32. A cutting member without a blade support 32 may be bent or straight. Any of the components of a cutting member may be an integral element or assembled from pieces. For example, a blade may be a single piece of a metal, which is bent or unbent. In embodiments comprising a blade and a blade support, the blade may be attached to the blade support in any manner. For example, the blade can be attached to the blade support by welding, brazing, soldering, gluing or any other technique. A group of cutting members 29 may comprise different cutting members 28, e.g., one or more cutting members 28 comprising a blade support 32 and one or more cutting members 28 without a blade support 32.

Each cutting member in the group of cutting members 29 is, in an example, resiliently mounted in a blade receiving section 31 of the shaving head 20. The blade receiving section 31 comprises a longitudinal space in the shaving head 20 that is sized to accommodate the group of cutting members 29. At least one cutting member of the group of cutting members 29, up to all cutting members in the group of cutting members 29 may be resiliently mounted in the blade receiving section 31. In the illustrated example of FIG. 2*a-b*, the transverse inner sides of frame 21 comprise a plurality of holding slots 34*a-d*. Each holding slot 34*a-d* on the transverse inner sides is configured to accept and retain one side of a blade support 32*a-d* of a cutting member 28*a-d* of the group of cutting members 29 so that the cutting members of the group of cutting members 29 are held in the blade receiving section 31 with a substantially parallel inter-blade span. Therefore, as many holding slots 34*a-d* may be provided in each transverse inner side of frame 21 as there are blade support members.

Between the blade receiving section 31 and the handle (in a part adjacent to a handle 2 connection, for example) there may, in examples, provided one or more cross members 35 that may be integrally formed with the frame 21. The cross members 35 may comprise a plurality of blade support guides 36 provided as a plurality of protuberances aligned with the holding slot 34 on the transverse inner sides of the frame 21. The blade support guides may function to regulate the parallel inter-blade span in a longitudinal direction. The inter-blade span IBS or spacing between the blade supports 32 may be the same or variable.

The shaving head 20 of FIG. 2*a-b* may comprise resilient fingers 38*a*, 38*b*, 38*c*, 38*d*, for example under the first retainer 26. The shaving head 20 may comprise resilient fingers under the second retainer 27 that are in transverse corresponding alignment with resilient fingers 38*a*, 38*b*, 38*c*, 38*d* under the first retainer 26. The resilient fingers each may exert a bias force against respective cutting members of the group of cutting members 29 in the direction of the shaving plane SH such that the cutting members of the group of cutting members 29 are in a rest position, when assembled. In the rest position, the cutting edges 30 of the blades 33, at each lateral end of the blades 33 near the first 26 and second 27 retainers, bear against corresponding stop portions, for example. In an example, the stop portions may be the first 26 and second 27 retainer. Accordingly, the rest position of the cutting members 28*a-d* is well defined, enabling a high shaving precision. Of course, the illustrated biasing arrangement has many variations. For example, a further plurality of resilient fingers may be provided on one or more of the cross members 35. In a simplified razor cartridge design (such as for low cost, disposable razors), the resilient fingers may be omitted. A skilled person will appreciate that the number of resilient fingers 38 to be provided is related to the number of cutting members 28*a-d* in the group of cutting members 29, and that fewer or more than eight resilient fingers 38 can be provided. Each of the cutting members 28 may comprise a blade support 32 and a blade 33.

FIG. 2*b* further illustrates a longitudinal trailing assembly 49 that may, in some examples, be included as part of a shaving head 20 but is not essential. In particular, the longitudinal trailing assembly 49, in examples, comprises a longitudinal skin care element 50 (e.g. a lubricating strip) for applying a compound, such as a lubricating compound, to the shaving plane after the cutting edges 30 of the blades have passed over the shaving plane.

The longitudinal trailing assembly 49, in examples, comprises a longitudinal trimming blade 53 disposed on the trailing longitudinal side 25 of the shaving head 20. The trimming blade 53 may, for example, be used for trimming hairs that are awkward to reach using the blades 33 of the group of cutting members 29, such as extraneous nasal hairs. In an example, the trimming blade 53 only extends across a proportion of the longitudinal direction of the longitudinal trailing assembly 49, such as up to three quarters, up to one half, or up to one quarter. As illustrated, the trimming blade 53 is mounted on a trimming blade support 54. The assembly of the trimming blade 53 mounted on a trimming blade support 54 is, in an example, identical to the design of the blade receiving section 31, blade support 32, and blade 33 comprised in the group of cutting members 29 to reduce parts variation. Alternatively or in addition, the trimming blade 53 and trimming blade support 54 are produced to a different design to the design of the blade receiving section 31, blade support 32, and blade 33 comprised in the group of cutting members 29. For the purposes of this specification, the trimming blade 53 is not comprised within the group of cutting members 29 intended to contact the shaving plane. In an example, the longitudinal trailing assembly 49 comprises a retractable cover 52 as a safety feature, and to keep the trimming blade 53 sharp when not in use.

In common with the frame 21 of the razor, the longitudinal trailing assembly 49 and/or the retractable cover 52 may be provided as a plastic or resin material. In an example the longitudinal trailing assembly 49 is formed integrally with the frame 21. In an example, the longitudinal trailing assembly 49 is glued or ultrasonically welded to the frame 21, for example. In an example, a razor cartridge 21 is provided without a longitudinal trailing assembly 49 such that the trailing edge of the frame 21 in the shaving direction is the trailing longitudinal side 25 of the shaving head 20. In an embodiment where the shaving head 20 comprises the longitudinal trailing assembly 49, the trailing longitudinal side 25 of the longitudinal trailing assembly 49 in the shaving direction is considered to be the trailing edge of the frame 21 in the shaving direction.

FIG. 2*b* illustrates a side view of the holding slots 34 provided in the first 26 and second 27 retainer for holding the group of cutting members 29. The plurality of blade support guides 36 and the plurality of resilient fingers 38 shown in FIG. 2*a* is not shown in the projection of FIG. 2*b* to aid clarity. FIG. 2*b* illustrates a progressively increasing span in the longitudinal direction between the succession of holding slots 34 for holding the group of cutting members 29 provided in the first 16 and second 18 side portions, in the direction from the leading longitudinal side 24 to the trailing longitudinal side 25. The inter blade span between any or all of the blades can also be the same.

Of course, the provision of a succession of holding slots 34 in the first 26 and second 27 retainers to support the cutting members of the group of cutting members 29 is not essential. The group of cutting members 29 could also be supported using a plurality of blade support guides 36 (protuberances) positioned on one or more cross members 35, for example, where the plurality of blade support guides 36 provide a progressively increasing inter-blade span in the longitudinal direction from the leading longitudinal side 24 to the trailing longitudinal side 25 of the shaving head 20. In an example, a plurality of blade support guides 36 and a succession of holding slots 34 may be used in combination to provide progressively increasing span in the longitudinal direction between the leading and the trailing side of the razor cartridge.

For each of the embodiments described herein, the blade support 32 and blade 33 can be integral or assembled together. A blade may be mounted on the outer surface of a blade support, such that in use, no part of the blade support comes into contact with shaving plane SH. Alternatively or in addition, a blade 33 may be mounted on an inner surface of the respective blade support and projects from underneath the inner surface. In such embodiments, the cutting edge of the blade 30 and the end of the blade support 32 may contact the skin during shaving simultaneously, leading to a reduction in the force exerted on the shaving plane SH exerted by a single cutting edge, for example. In embodiments with a plurality of cutting members, some of the cutting members may comprise a blade mounted on the outer surface of a blade support and some of the cutting members may comprise a blade mounted on the inner surface of a blade support.

The blade 33 may have, in its flat portion, a thickness T1 about 0.1 mm (for example, between 0.04 and 0.11 mm). The total length L2 of the blade 33 between the cutting edge 30 of the blade 33 and the opposite back edge of the blade 33 is about 1 mm (for example, between 0.8 mm and 1.6 mm). The portion of the blade 33 that is in contact with the inner surface 66 of a blade support that, in use, faces away from a shaving plane SH has a length L1 that is about 0.4 to 1.3 mm long. In this way, a good retention of the blade on the underside of the blade support 32 (the inner surface of the blade support 32) is ensured.

In an example, the height of the cutting member 28H may be between 2.1 mm and 2.8 mm, particularly 2.5 mm. In an example, the front end of the blade support is rounded or chamfered to improve glideness properties of the cutting member.

In an example, the blade 33 may be positioned on the inner surface 66 of the blade support 32 to adjust the exposure E of the cutting edge 30 positively or negatively compared to the shaving plane SH. The exposure is a measure of how prominently the cutting edge 30 of a blade protrudes above or sinks below the shaving plane. In an example, the blade 33 may be positioned to have an exposure relative to the shaving plane SH in the range −80 um to +80 um, specifically an exposure of about −75 um, −65 um, −60 um, −55 um, −50 um, −45 um, −40 um, −35 um, −30 um, −25 um, −20 um, −15 um, −10 um, −5 um, 0 um, 5 um, 10 um, 15 um, 20 um, 25 um, 30 um, 35 um, 40 um, 45 um, 50 um, 55 um, 60 um, 65 um, 70 um, or 75 um.

The length L3 of the cutting member 28, between the cutting edge 30 and the outer face of the lower portion of the blade support 32 is about 1.0 mm (for example, between 0.9 mm and 1.6 mm).

The blade 33 may be fixed on the inner surface 66 of the blade support by welding or any other known means, such as by laser spot welding. In examples, the blade 33 is fixed on the inner surface 66 of the blade support by a plurality of spot welds (for example, between ten and sixteen spot welds) distributed along the longitudinal dimension of the blade support 32. Each of the spot welds may be performed on the inner face 70 of blade 33. Alternatively or in addition, each of the spot welds may be carried out on the outer surface of the blade support 68, or a mixture of the two. For more details of a cutting member comprising a bent blade support with a blade mounted on the inner surface of the blade support, reference is made to co-pending European Application EP20208191.5 (filed on Nov. 17, 2020), which is hereby incorporated by reference. EP20208191.5 describes especially with respect to FIG. 6*a* possible bent-blade design in detail and which may be used in conjunction with the present disclosure.

Figure 3A:
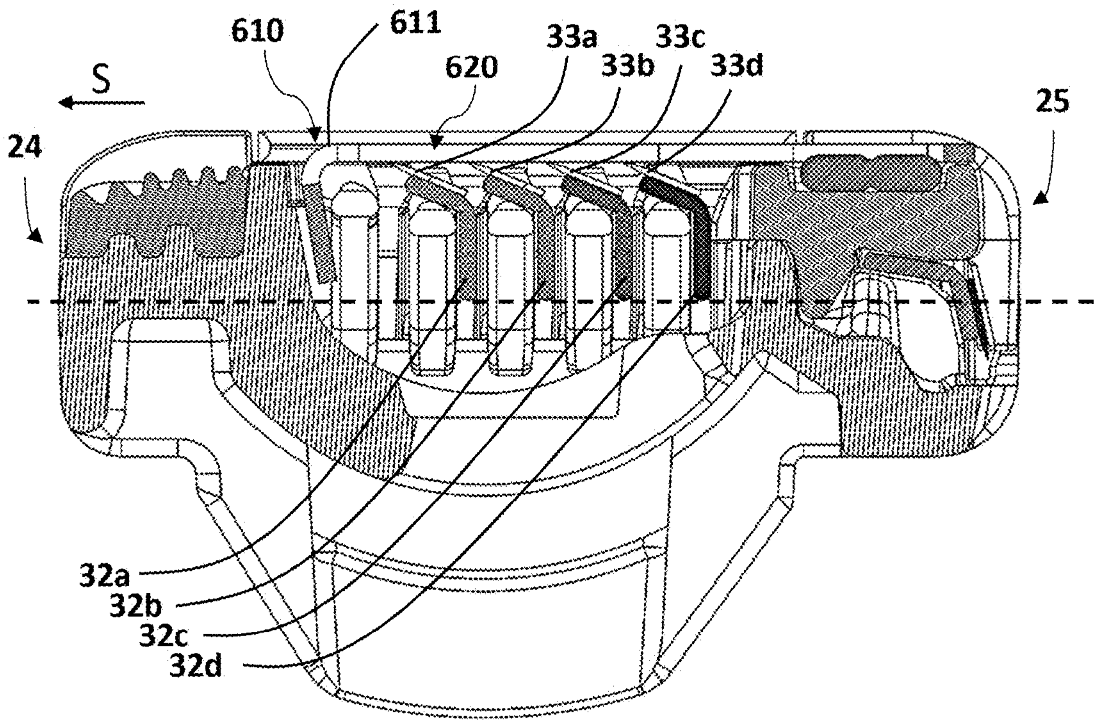
FIGS. 3*a-b* show a cross-section of a shaving head comprising an actuator member in accordance with the present disclosure without and with a force acting on the actuator member.
Figure 3B:
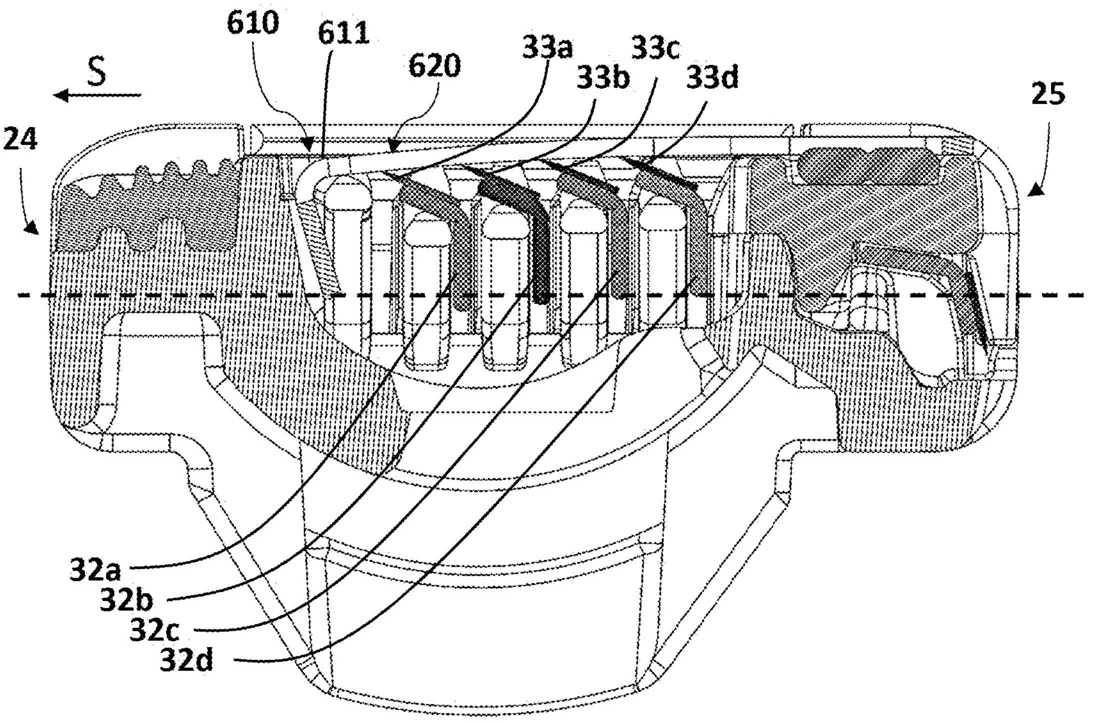
Figure 4:
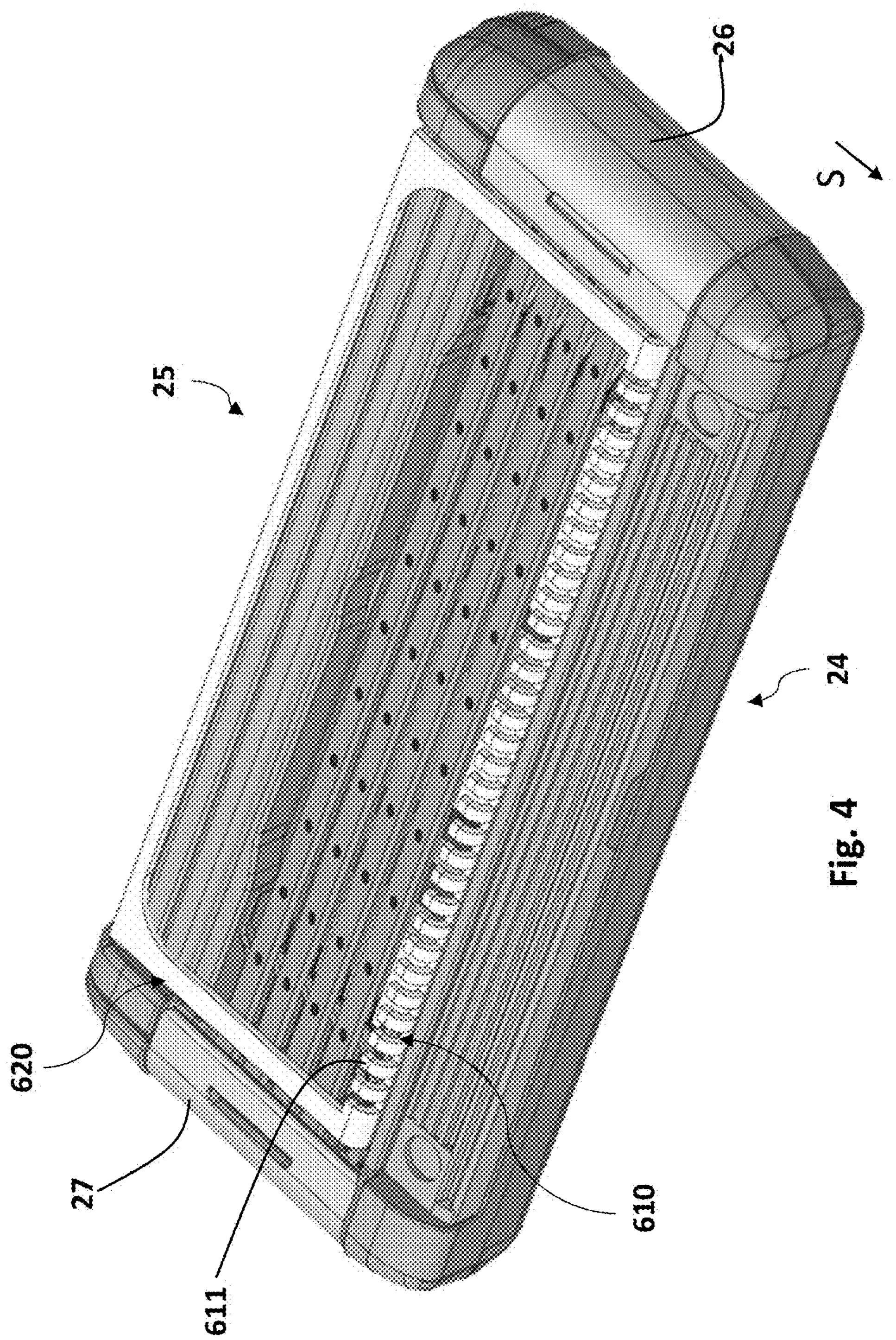
FIG. 4 shows an isometric view of a shaving head in accordance with the present disclosure.
Figure 5A:
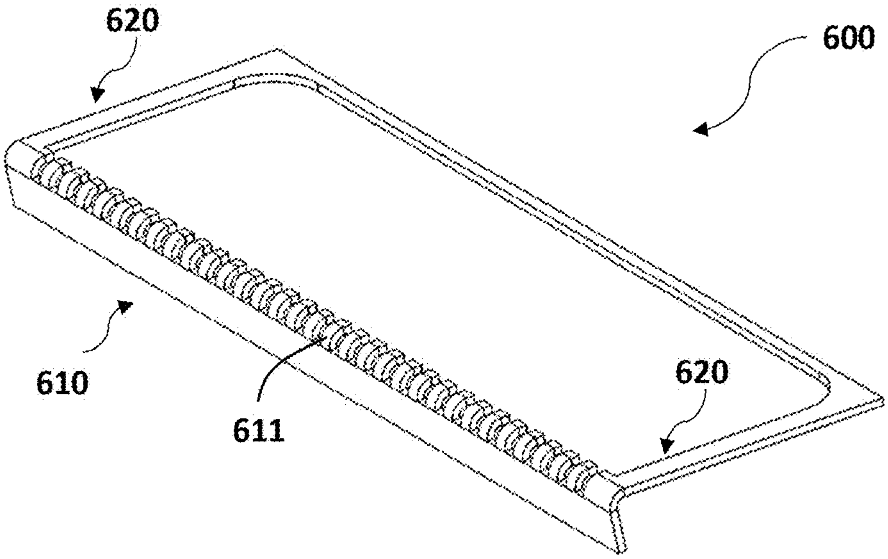
FIGS. 5*a-b* show an isometric view and a top view of an actuator member in accordance with the present disclosure.
Figure 5B:
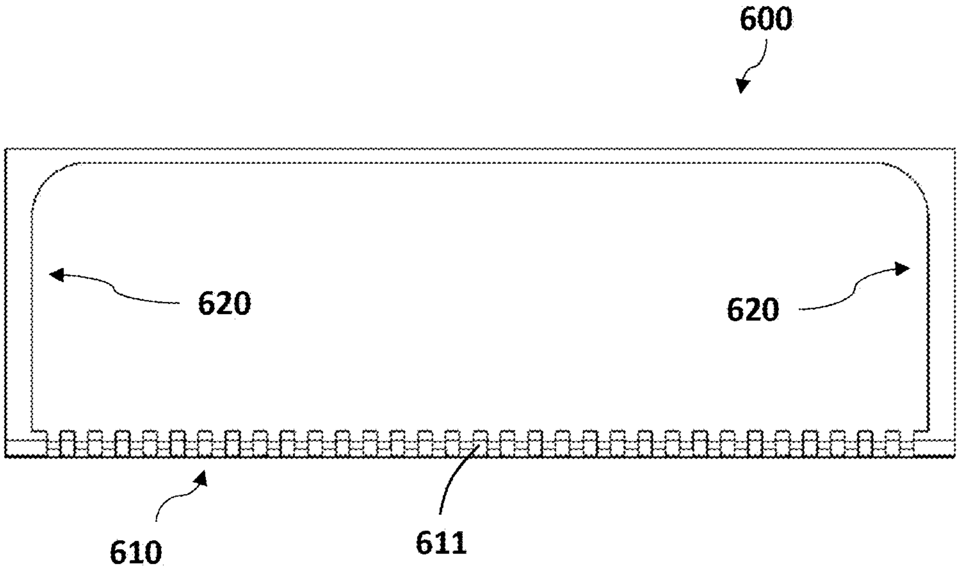

FIGS. 3 to 5 show a shaving head in accordance with the present disclosure. FIG. 3*a* shows a shaving head comprising an actuator member 610 in accordance with the present disclosure without a force acting on the actuator member 610. FIG. 3*b* shows the shaving head of FIG. 3*a*, wherein a force acts on the actuator member 610, which results in a retraction of one or more cutting members. FIG. 4 shows an isometric view of an example shaving head. FIGS. 5*a-b* shows an isometric view and a top view of an example actuator member.

As can be seen in FIG. 3, the shaving head comprises a frame and one or more cutting members arranged between a leading longitudinal side and a trailing longitudinal side of the frame. The arrangement can be as discussed above for FIG. 2, which, however, is not intended to be limiting. The one or more of the cutting members shown each comprise a blade support 32*a-d* and a blade 33*a-d*. As discussed above, the blade support 32*a-d* and blade 33*a-d* may be joined together or may be an integral part. The cutting members do not require any dedicated blade support and blade and what matters is only that one or more cutting member are provided. The one or more cutting members are movable in a direction orthogonal to a shaving plane. As discussed above, the shaving plane may be approximated as a line between the highest points on the skin-contacting surfaces of a shaving head—for example, the flat plane between the top of a guard and the top of a cap of the shaving head. Movement of the razor handle causes the blades of the shaving head to be moved across the shaving plane in the shaving direction, enabling the blades to remove unwanted hair. In the following, the shaving plane is generally defined by elements, which are not movable in an upward/downward direction as this would result in a moving shaving plane. For example, the pressure sensor element 610 of the actuator member 600, which will be described in the following, may be defined in relation to the shaving plane, but it does itself not define a fix point for the shaving plane.

The actuator member 600 may be coated with antifriction materials to improve shaving performance. In addition, or, alternatively, the actuator member 600 may be colored to enhance product aesthetics. In any of the embodiments described herein, the actuator member 600 may be non-permanently attached to the guard. The actuator member may also be a detachable component.

In accordance with the present disclosure, FIG. 3 shows that the shaving head comprises an actuator member 600. The actuator member 600 in general is configured to retract one or more cutting members relative to the shaving plane in response to a pressure exerted on the actuator member. The actuator member may retract one or more of the cutting members into the frame in response to a pressure exerted on the actuator member. The actuator member 610 shown in FIG. 3 comprises a pressure sensor element 610, which (mechanically) senses any uneven surfaces of the skin (such as bumps, wrinkles, liver spots, pimples, etc.). As may be best seen in FIGS. 4-5, the pressure sensor element 610 may comprise one or more comb teeth 611, which are configured to contact the skin. The pressure sensor element 610 or the one or more comb teeth 611 may extend above the shaving plane in an “at-rest” condition without any force acting on the actuator member. For example, the pressure sensor element 610 or one or more of the comb teeth 611 may extend about 0.05 mm to about 3.0 mm above the shaving plane. In an example, the pressure sensor element 610 or one or more of the comb teeth 611 may extend about 0.05 mm to about 1.0 mm above the shaving plane. In an example, the pressure sensor element 610 or one or more of the comb teeth 611 may extend about 0.05 mm to about 0.3 mm above the shaving plane.

The pressure sensor element 610 or the one or more comb teeth 611 may also be substantially at the same level with the shaving plane or even be slightly below the shaving plane. In such embodiments, the original exposures of the one or more cutting members are not or only minimally affected by the pressure sensor element or the one or more comb teeth when used on a smooth skin surface. The pressure sensor element or the one or more comb teeth are only “activated” by skin anomalies and adjust the exposure of the one or more cutting members.

In examples, the pressure sensor element 610 of the actuator member 600 is elastically supported in the shaving head. The pressure sensor element 610 may therefore be connected to any portion of the frame or to any element arranged on or within the frame (for example, the pressure sensor may be connected or coupled to one or more cutting members).

The pressure sensor element 610 may be a longitudinal element having a continuous geometry in the longitudinal direction or may comprise a comb-like geometry in the longitudinal direction. A comb-like geometry is for example shown in FIGS. 4-5 but not intended to be limiting. A comb-like geometry for the pressure sensor element 610 may align and direct hair to be cut towards the one or more cutting members. In other words, a comb-like pressure sensor element 610 may prepare and sort hair prior to the hair being cut.

The pressure sensor element 610 may be a non-cutting element. The pressure sensor element 610 may, in examples, be a cutting element, for example one of the one or more cutting members.

The pressure sensor element 610 may be arranged at different positions. In the embodiment shown in FIGS. 3 to 5, the pressure sensor element 610 is arranged between the leading longitudinal side 24 of the frame and the leading cutting member 28*a*. It may also be arranged between the leading longitudinal side 24 of the frame and one of the following cutting members 28*b*, 28*c*, 28*d*. In the embodiment shown in FIG. 10, the pressure sensor element 610 is arranged between the trailing longitudinal side 25 of the frame and the trailing cutting member 28*e*. It may also be arranged between the trailing longitudinal side 25 of the frame and one of the preceding cutting members 28*d*, 28*c*, 28*b*.

The pressure sensor element 610 is configured to generate a force for decreasing the exposure of one or more of the cutting members. A shaving head may comprise any number of pressure sensor elements 610, for example three, four, five, six, seven, or eight.

The actuator member 600 may comprise one or more cantilever elements 620, which is configured to transmit a force from the pressure sensor element 610 to one or more of the cutting members. The cantilever element 620 may therefore be indirectly or directly connected to the pressure sensor element 610. The actuator member 600 of the embodiment of FIGS. 3 to 5 comprises a cantilever element 620, which may be best seen in FIG. 5. Shown in FIG. 5 is an actuator member 600 with a rectangular shape and comprising a pressure sensor element 610 and two cantilever elements 620 extending from it. The two cantilever elements are connected to each other at a rear side of the actuator member 600 (thus forming a rectangular shape) but a connection at the rear end is not necessary (see FIG. 12). The pressure sensor element 610 may be positioned at a leading longitudinal side 24 of the frame (see FIGS. 3 to 5) or at a trailing longitudinal side 25 of the frame (see FIG. 10). The cantilever elements 620 are shown to extend from the ends of the pressure sensor element 610 in an orthogonal manner but this is not intended to be limiting. The cantilever elements 620 could also extend in any angle from the pressure sensor element 610. The cantilever element 620 may have any shape and dimension. Shown are two cantilever elements but there may be just one cantilever element or more than two cantilever elements. The cantilever elements may be arranged in any suitable manner and extend from any portion of the pressure sensor element. The one or more cantilever elements may extend from ends of the pressure sensor element (as shown e.g in FIG. 5) or from any portion along the length of the pressure sensor element (as shown e.g. in FIG. 12).

At least one of the cantilever elements 620 is configured to contact one or more of the cutting members. The cantilever element 620 may only be configured to contact the one or more cutting members or may be (indirectly or directly) connected to one or more cutting members. A cantilever element 620 may also be (indirectly or directly) connected to one (or more) of the cutting members and only configured to contact one or more cutting members without being connected to these. A cantilever element may also only specifically connect/contact one or more of a plurality of cutting members. A cantilever element may for example only connect/contact two adjacent cutting members or e.g. only ever second cutting member. In an example, a cantilever member is fixedly attached to a trailing cutting member but only touches or contacts the other cutting members. The cantilever element 620 may be configured to contact or connect to a cutting member at any position. The cantilever element 620 may be configured to contact or connect to one or more blades 33*a-d* (see for example FIGS. 3, 4, 8, 9 and 11). In addition, or alternatively, the cantilever element 620 may be configured to contact or connect to one or more blade supports 32*a-e* (see FIG. 10). One or more of the cutting members may comprise one or more apertures 630 and the cantilever element 620 may extend through at least one of the apertures 630. The one or more apertures 630 of a cutting member may be in the blade support 32*a-e* of the cutting member (as shown in FIGS. 10-11). The apertures 630, however, may also be in the blades 33*a-d*.

One or more cantilever element 620 may in addition or alternatively indirectly transmit a force from the pressure sensor element 610 to one or more of the cutting members 28*a-d*, i.e. without directly contacting or connecting to the cutting members 28*a-d*. For example, in embodiments in which the cutting members 28*a-d* are positioned on resilient fingers 38*a-d* (see e.g. FIG. 2*a*), the cantilever element 620 may contact or connect to the resilient fingers 38*a-d* in order to retract one or more cutting members.

One or more cantilever elements 620 may be connected to the frame. Such a connection, however, is not required and the cantilever elements 620 may for example be only secured to one or more of the cutting members (e.g. a trailing cutting member). One or more cantilever elements 620 may be connected to the frame at a position proximate to the leading longitudinal side of the frame or at a position proximate to the trailing longitudinal side of the frame. A connection of side portions of the cantilever elements 260 to the frame is also possible.

In the example shown in FIG. 3, the cantilever element 620 is connected proximate a trailing longitudinal side 25 of the frame and the pressure sensor element 610, to which the cantilever element 620 is connected to, is positioned proximate the leading longitudinal side 24 of the frame. In other embodiments (see e.g. FIG. 10), the arrangement is the opposite, i.e. the one or more cantilever elements 620 may be connected proximate to the leading longitudinal side 24 of the frame and one or more pressure sensor elements may be positioned proximate to the trailing longitudinal 25 side of the frame. In any of the examples disclosed herein, one or more cantilever elements may elastically support the pressure sensor element in the shaving head.

FIG. 3*a* shows the actuator member 300 in an "at rest" condition, i.e. without any force or load acting on it. The cantilever element 620 is shown as being straight, although this configuration is not intended to be limiting. The cantilever element 620 in this example contacts the blades 33*a-d* at their top or cutting surfaces. As can be seen, the one or more cutting members are more or less in the same plane as indicated by the dashed lines. In the "at-rest" condition, however, one or more cutting members may already have a different exposure relative to the shaving plane. For example, the one or more cutting members may have progressively increasing (or decreasing) exposures of the blades from one longitudinal side of the frame to the other, which is more pronounced after "activation" of the actuator element as further described below. In the "at rest" condition, the actuator member 300 may already be slightly pre-tensioned, in particular the cantilever element 320 may already exert a force on the one or more cutting members. Such a pre-tensioning may accelerate a response of the pressure sensing element 610 on the one or more cutting members, i.e., the retraction of the one or more cutting members relative to the shaving plane may than occur faster.

FIG. 3*b* shows the actuator member with a force acting on it. The cantilever element 620 is shown slightly bended because a pressure is exerted on the pressure sensor element 610. A bump on the skin or any other uneven surface of the skin may push the pressure sensor element 610 downwards into the frame, thereby bending the cantilever element 620. The cantilever element 620 in turn pushes one or more of the cutting members 28 downwards into the frame, i.e. retracts the cutting members 28. As can be seen, the exposure of the one or more cutting members 28 relative to the shaving plane progressively increases from the leading side end 24 to the trailing side end 25. The curvature of bending of the cantilever element 620 may cause the cutting members 28 to be pushed downwardly in a progressive manner. For example, and as shown in FIG. 3*b*, the blade 33*a* of the first cutting member 28*a* is retracted relative to the shaving plane more than blade 33*b*, which itself is more retracted than blade 33*c*. Blade 33*d* is the blade which is least retracted relative to the shaving plane. The dashed line shows the bottom ends of the cutting members 28 in the at-rest condition. By decreasing the exposure of one or more cutting members 28, skin irritations may be reduced. The amount of retraction of a cutting member 28 relative to the shaving plane depends on and can be adjusted by the material properties of the cantilever member 620, the shape of the cantilever member 620 (prior, during and after bending), the manner how a force is transmitted from the pressure sensor element 610 to the cantilever element 620 and the arrangement of the cantilever element 620 with respect to the pressure sensor element 610. The amount of retraction of a cutting member 28 relative to a shaving plane also depends on and can be adjusted by the manner of attachment of the cantilever element 620 to the frame and/or cutting members 28. The amount and dynamic of a retraction of a cutting member 28 may also be defined by a surface, along which the pressure sensor element 610 (or any other portion of the actuator member 600 such as the cantilever element 620 itself) is to configured to slide along. For example, the pressure sensor element 610 may be configured to slide along a curved surface of the frame, thereby progressively changing the force transmitted from the pressure sensor element 610 to the cantilever element 620 (and ultimately to one or more cutting members). A stop may also be provided to limit the amount of movement of the pressure-sensing element 610. A stop may in addition or alternatively be provided to limit the amount a cantilever element 620 may move or flex.

Figure 19:
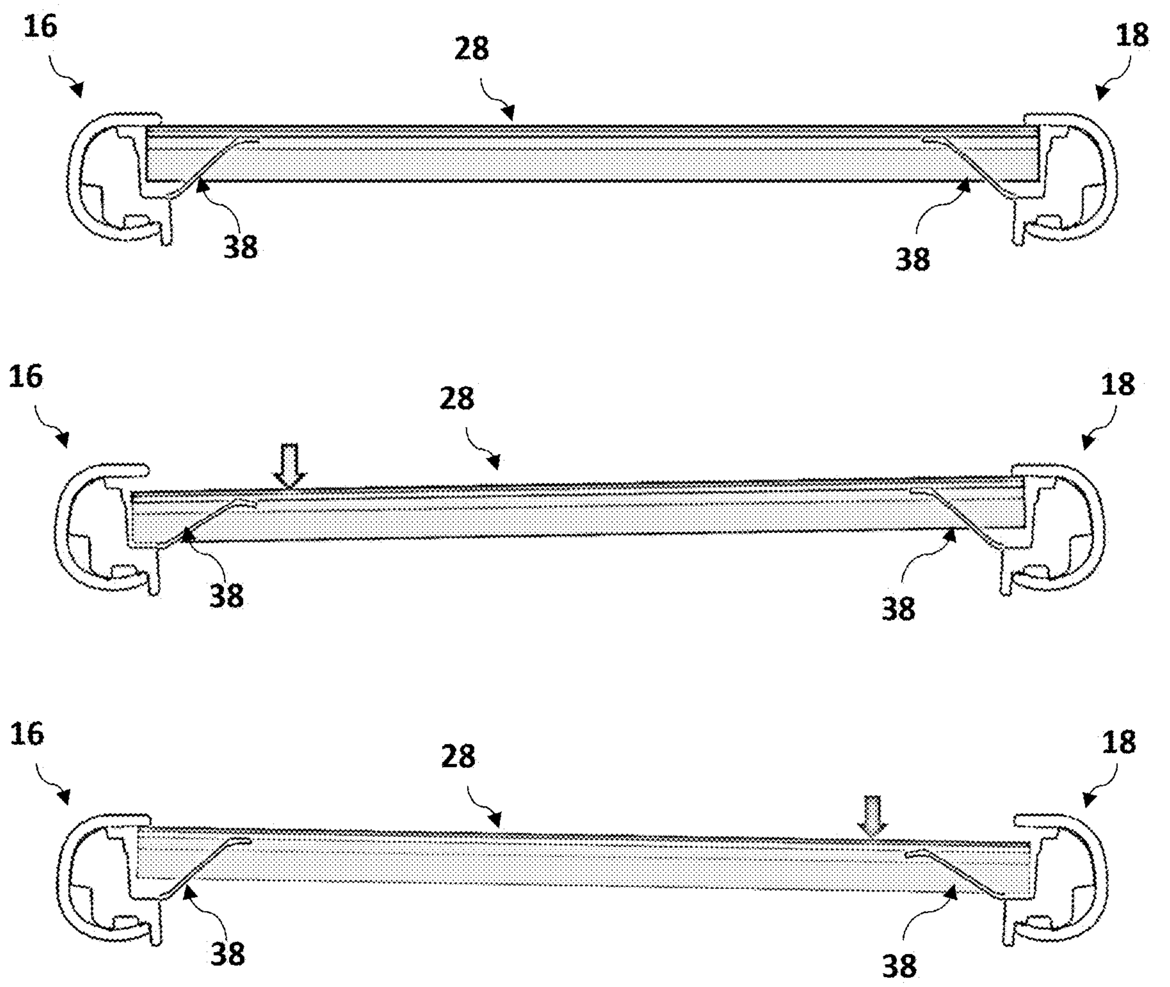
FIG. 19 shows longitudinal cross-sections through a portion of a shaving head.

An actuator member 600 does not necessarily have to be configured to push a cutting member 28 downwards along its entire length such that the cutting edge of the cutting member 28 remains substantially parallel to a shaving plane. Instead, an actuator member 600 may be configured to only push a portion of the cutting member 28 downwards, e.g., a portion of the cutting member facing towards the right or left side of the shaving head. In other words, the cutting member may be pushed downwards in an angled manner, i.e., its cutting edge is no longer parallel to the shaving plane when pushed downwardly. The pressure sensor element 610 of the actuator member 600 may only "sense" a skin anomaly on one side of the shaving head, which results in the cantilever element 620 pushing one or more cutting member(s) 28 only on that side downwards, whereas the orientation of the cutting member(s) 28 is not affected on the opposite side. For that purpose, two or more cantilever elements 620 may be provided, which are configured to actuate a respective portion of one or more cutting members. FIG. 19 shows schematic longitudinal cross-sections through a portion of a shaving head. The top panel shows a cutting member 28 in an "at-rest" condition, in which the cutting edge is substantially parallel to a shaving plane. In the middle panel, it is schematically shown that a pressure exerted only on a side of the actuator member (not shown) results in the cutting member 28 being only pushed downwards on that side. The pressure is indicated by the downward pointing arrow. In the bottom panel, it is schematically shown that a pressure exerted on the other side results in the cutting member 28 being only retracted on that side. In the schematic examples shown, the cutting member is mounted on elastic fingers 38, which, however, are not an essential element of the disclosure.

As discussed above, the blade 33 of a cutting member may (in an "at rest" condition) be positioned to have an exposure relative to the shaving plane SH in the range −80 um to +80 um, specifically an exposure of about −75 um, −65 um, −60 um, −55 um, −50 um, −45 um, −40 um, −35 um, −30 um, −25 um, −20 um, −15 um, −10 um, −5 um, 0 um, 5 um, 10 um, 15 um, 20 um, 25 um, 30 um, 35 um, 40 um, 45 um, 50 um, 55 um, 60 um, 65 um, 70 um, or 75 um.

The exposures of the one or more cutting members in the "at rest" condition may be the same or different. For example, the one or more cutting members may in the "at rest" condition already have different exposures, e.g. a progressively increasing exposure from a leading end to a trailing end of the frame. An increasing exposure may be less skin irritating and hair may be cut in steps. The "at rest" exposures may be altered by the actuator member in response to a pressure exerting on it. For example, the progressively increasing "at rest" exposures of the cutting members may be more pronounced upon activation of the actuator member.

The actuator member 600 may be configured to retract one or more of the cutting members or change the exposure of one or more of the cutting members by for example 5 um, 10 um, 15 um, 20 um, 25 um, 30 um, 35 um, 40 um, 45 um, 50 um, 55 um, 60 um, 65 um, 70 um, 75 um, 80 um, 85 um, 90 um, 100 um, 110 um, 120 um, 130 um, 140 um, 150 um, 160 um, 170 um, 180 um, 190 um, 200 um, 210 um, 220 um, 230 um, 240 um, 250 um, 260 um, 270 um, 280 um, 290 um or 300 um relative to the shaving plane.

The actuator member 600 may be configured to retract one or more (or all) of the cutting members by substantially the same amount. The actuator member 600 may be configured to retract one or more of the cutting members by different amounts. The actuator member may be configured to produce progressively increasing or progressively decreasing exposures of the cutting edges of a plurality of cutting members (seen e.g. from a leading longitudinal side to a trailing longitudinal side of the frame).

In addition, or alternatively to decreasing the exposure of one or more of the cutting members e.g. by a retraction relative to the shaving plane, the actuator member may be configured to bend one or more of the cutting members. A bending of one or more cutting members may also reduce skin irritations. The actuator member may bend a cutting member in addition or alternatively to retracting a cutting member. The bending of a cutting member may occur in any direction. For example, the bending of the cutting member may result in the blade of a cutting member assuming another angle with respect to a shaving plane. In the bended configuration, the blade may then cause less skin irritations because of the different angle of the blade.

Figure 6:
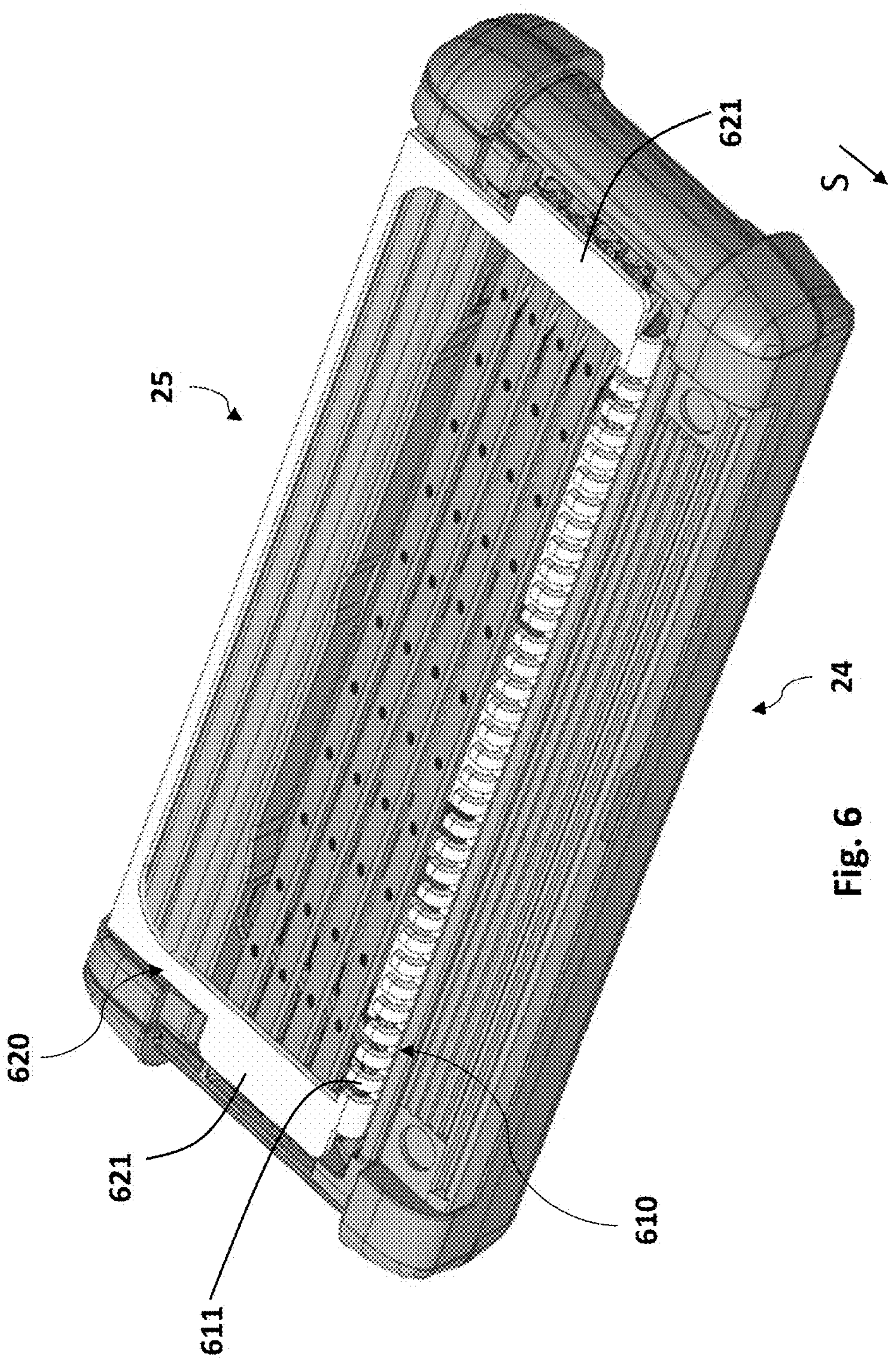
FIG. 6 shows an isometric view of a shaving head in accordance with the present disclosure.
Figure 7A:
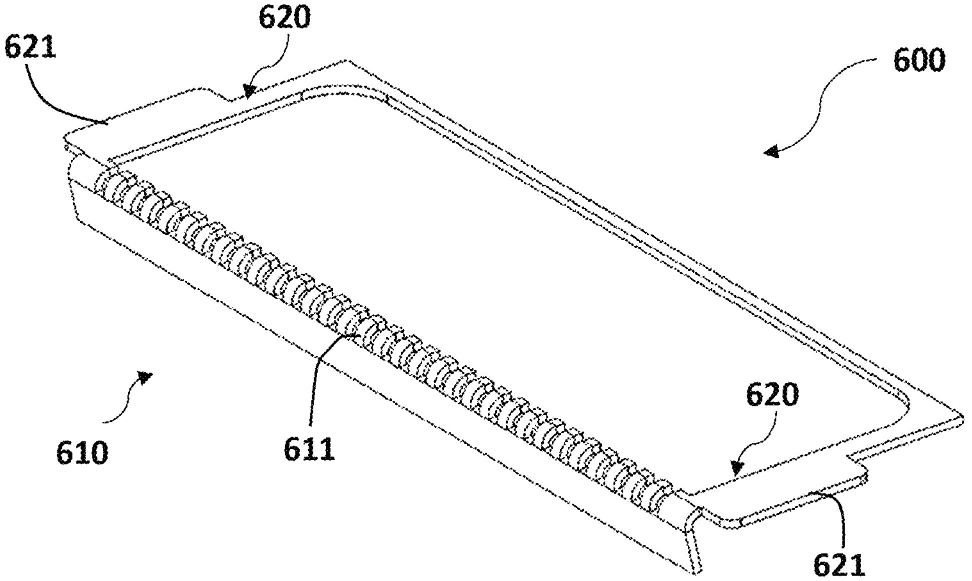
FIGS. 7*a-b* show an isometric view and a top view of an actuator member with a cantilever member with side extensions in accordance with the present disclosure.
Figure 7B:
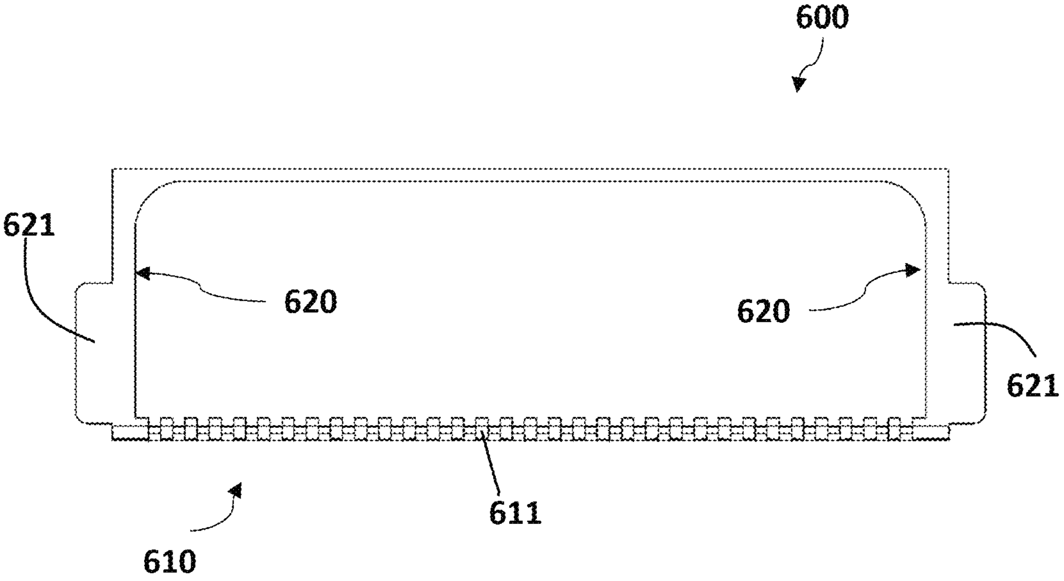

FIGS. 6 to 9 show a shaving head in accordance with the present disclosure. FIG. 6 shows an isometric view of a shaving head with a cantilever member having side extensions. In the examples of FIGS. 6, 7 and 9, the shaving head does not comprise blade retainers. FIGS. 7*a*-*b* show an isometric view and a top view of a cantilever member with side extensions. FIGS. 8*a*-*b* show a shaving head comprising an actuator member in accordance with the present disclosure without and with a force acting on the actuator member. All features mentioned above with respect to FIGS. 1 to 5 are compatible and combinable with the example of FIGS. 6 to 9. Especially the features which may be identical or similar will not be described again.

As can be seen in FIGS. 6-7, the actuator member 600 comprises cantilever elements 620 with side extensions 621. The cantilever element 620 may comprise one, two or more side extensions. One or more side extensions may be arranged on each side of the actuator member 600 and extend outwardly (as shown) or instead or in addition extend inwardly (not shown). The side extensions may be configured to provide for an (additional) attachment area for connecting the cantilever element 620 to a portion of the frame. The side extensions may also be configured to provide an increased surface area for transmitting a force from a cantilever element 620 on one or more of the cutting members. The cantilever elements (with or without side extensions 621) may be secured to the frame by clips or retainers, e.g., by retainers 26 and 27 shown in FIG. 2*a*. The cantilever elements itself may comprise retainers or any other means for attaching the actuator member 600 to the frame. For example, the actuator member 600 may comprise retainers, e.g., at one or more sides. The actuator member 600 may comprise one or more cantilever elements 620 with side extensions 621. No additional retainers may be needed in such embodiments and one or more cutting members may be covered by the side extensions of the cantilever elements. The side extensions may thus protect the skin of coming in contact with the sharp pointy vertex of the blade edge. In such embodiments, the actuator member 600 may thus have a dual function, covering of the vertices of the one or more cutting members as well as adjusting exposure of one or more cutting members.

Figure 8A:
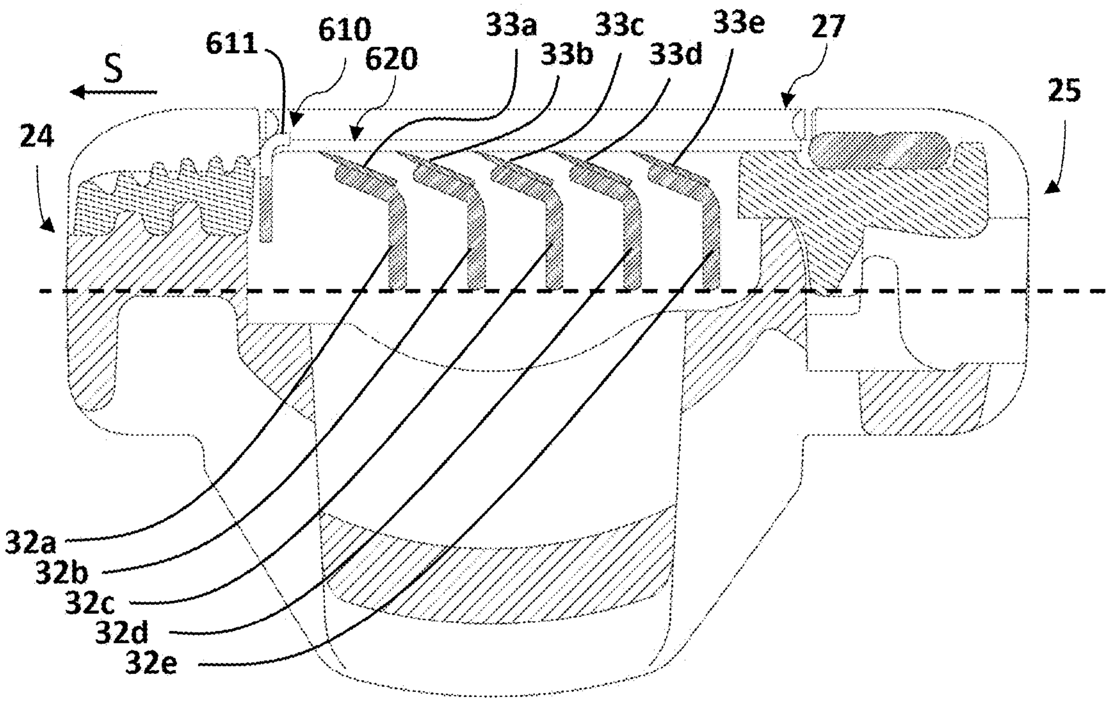
FIGS. 8*a-b* show a shaving head comprising an actuator member in accordance with the present disclosure without and with a force acting on the actuator member.
Figure 8B:
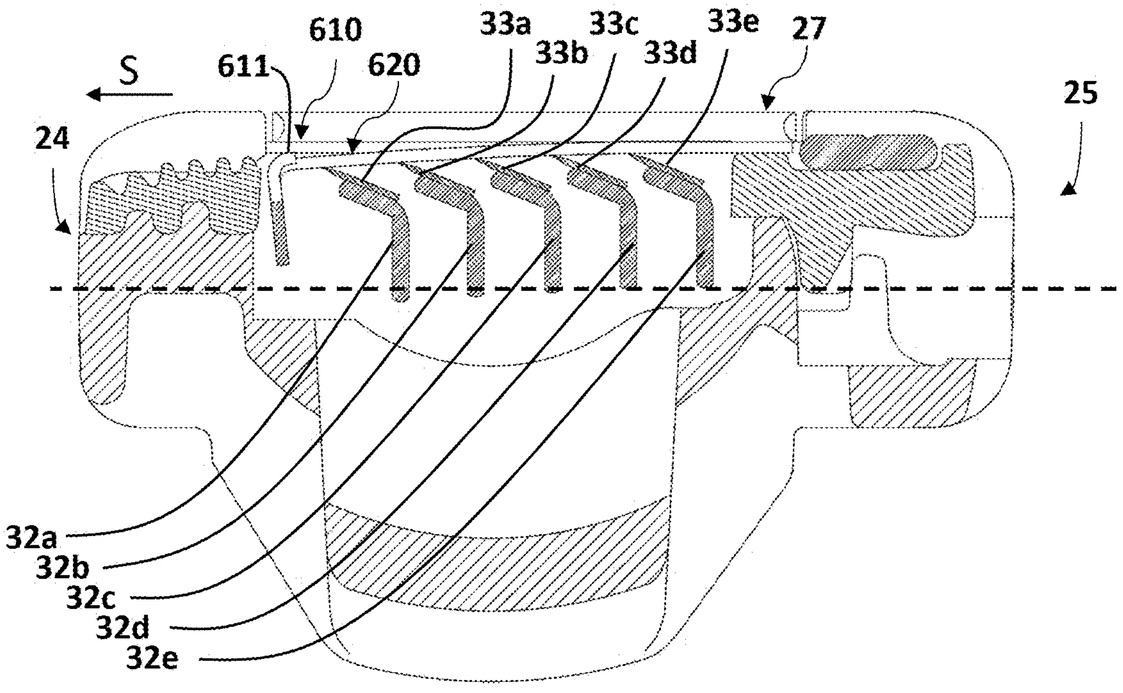

As can be seen in FIGS. 8*a*-*b*, the components and arrangements of the different elements is similar to the previous examples (see in particular the example of FIG. 3). Without a force exerting on the pressure sensor element 610 (FIG. 8*a*), the cantilever element 620 assumes a more or less straight shape (which, however, as discussed above, can have another pre-set shape). Upon applying a force on the pressure sensor element 610, the cantilever element 620 is bent, which may result in progressively decreasing exposures of one or more cutting members (FIG. 8*b*). In the example of FIGS. 8*a*-*b*, the shaving head may comprise retainers, see retainer 27.

Figure 9A:
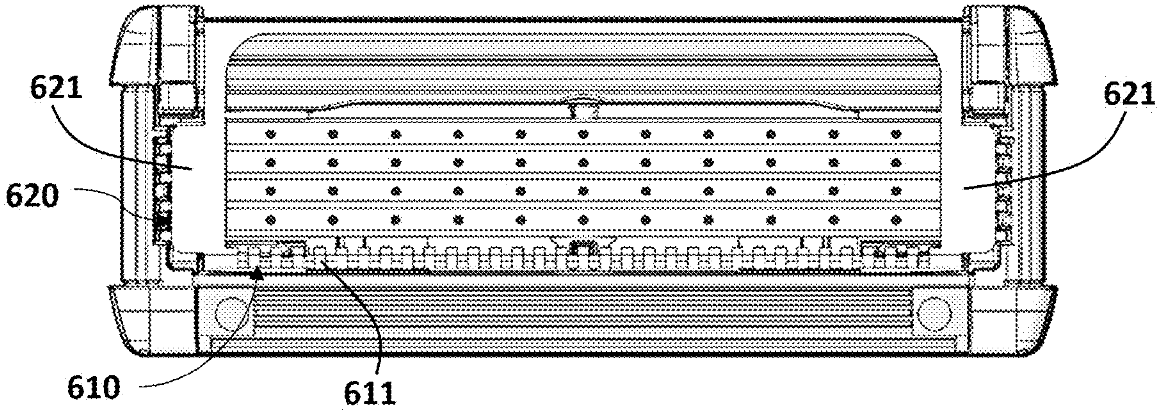
FIGS. 9*a-b* show a shaving head without a retainer in top view as well as in cross section with a force acting on the actuator member.
Figure 9B:
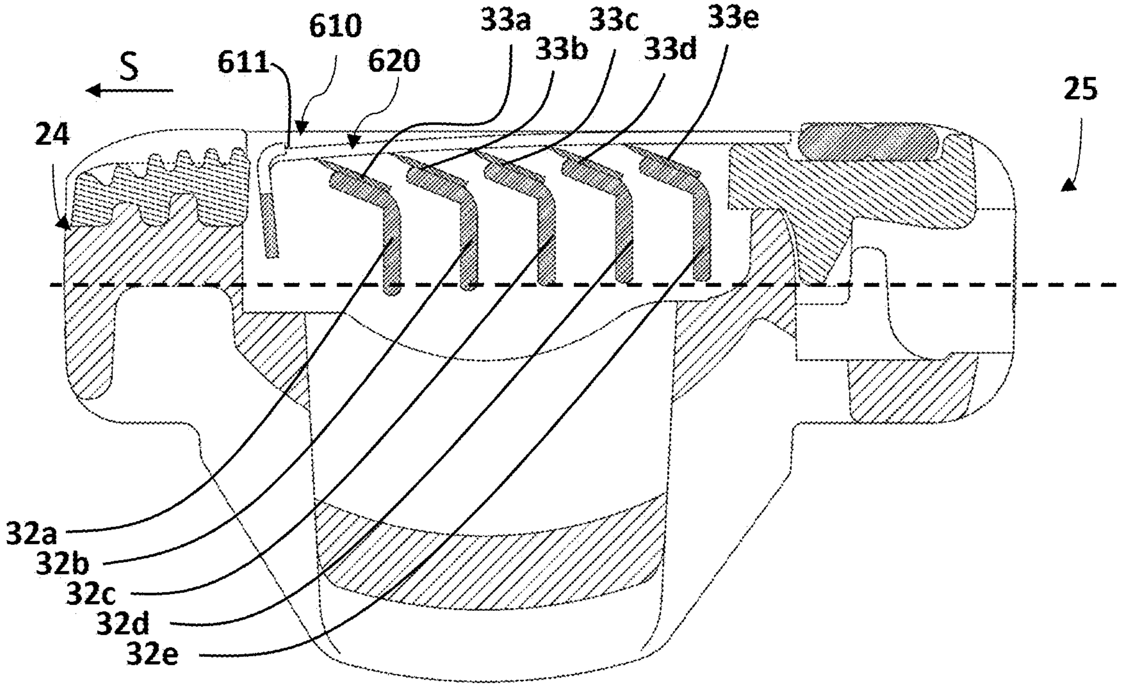

FIGS. 9*a*-*b* show a shaving head without a retainer in a top view as well as in cross section with a force acting on the actuator member. Cantilever elements 620 may be configured to retain one or more of the cutting members in the frame of the shaving head. A cantilever element may be attached to the frame at one end (e.g., with a clip or retainer or glue), whereas the other end is free-moving (at least towards the blade direction). One end may for example be glued to the frame. As can be seen in FIG. 9*a*, no separate retainer may be required and instead side extensions 621 of the cantilever elements 620 retain the one or more cutting members within the frame. The actuator member 600 may be secured to the frame with any of its portions, e.g., a side portion 621 of the cantilever element 620 and/or a rear portion of the actuator member. FIG. 9*b* shows a cross section with a force exerted on the pressure sensing element 610. In examples, the cantilever element 620 may actuate not all cutting members. Especially in such examples, the cutting members, which are not actuated by the cantilever element 620 may require other fasteners or means for retaining the cutting members in the frame.

Figure 14:
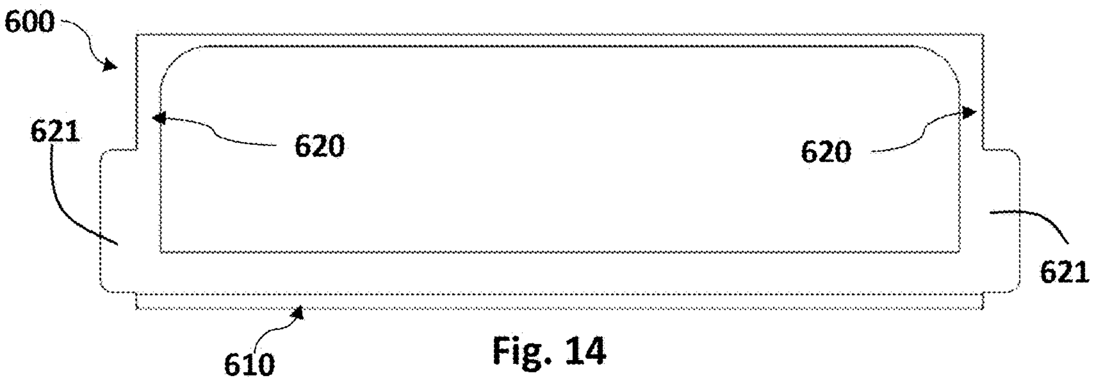
FIG. 14 shows a top view of an actuator member with a cantilever member with side extensions and a pressure sensor element without comb teeth in accordance with the present disclosure.
Figure 15:
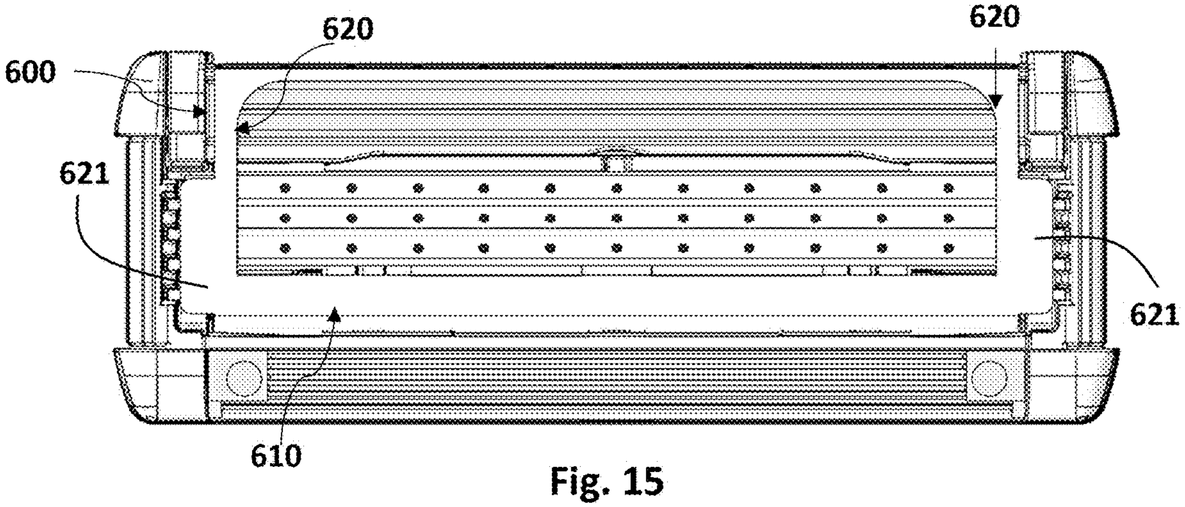
FIG. 15 shows a shaving head comprising the actuator member of FIG. 14.

FIGS. 14 to 15 show a variation of the actuator member described above. FIG. 14 shows a top view of an actuator member 600 with a cantilever member 620 with side extensions 621 and a pressure sensor element 610 without comb teeth. Without comb teeth, the surface for actuating the pressure sensor element 610 is increased, which may result in a more responsive pressure sensor element. FIG. 15 shows a shaving head comprising the actuator member of FIG. 14. Although the example of FIGS. 14-15 shows that the cantilever elements comprises side extensions 621, it is emphasized that these are not required. An actuator member may thus comprise a cantilever element and a pressure sensor element 610 without comb teeth.

Figure 16:
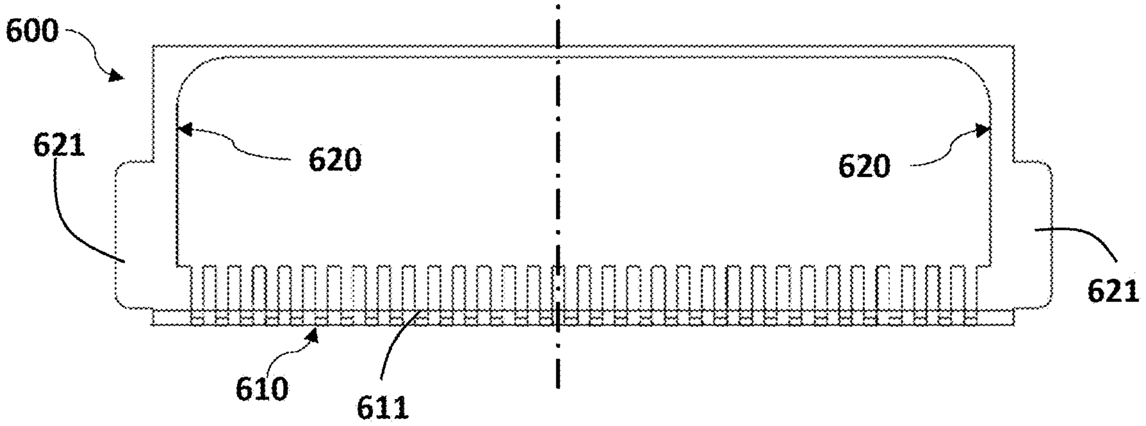
FIG. 16 shows a top view of an actuator member with a cantilever member with side extensions and a pressure sensor element with long comb teeth in accordance with the present disclosure.
Figure 17:
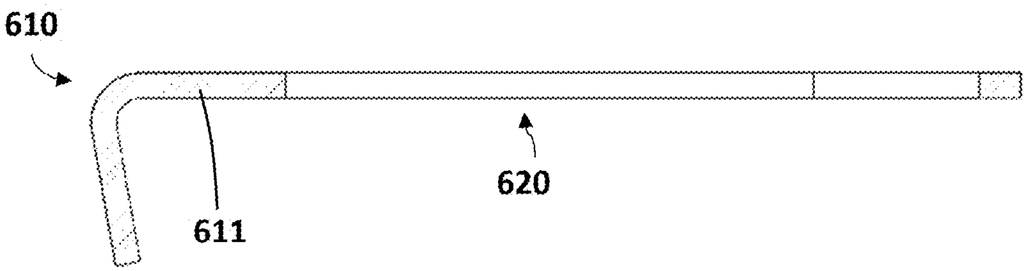
FIG. 17 shows a cross-section of the actuator member of FIG. 16 along the dashed line indicated in FIG. 16.
Figure 18:
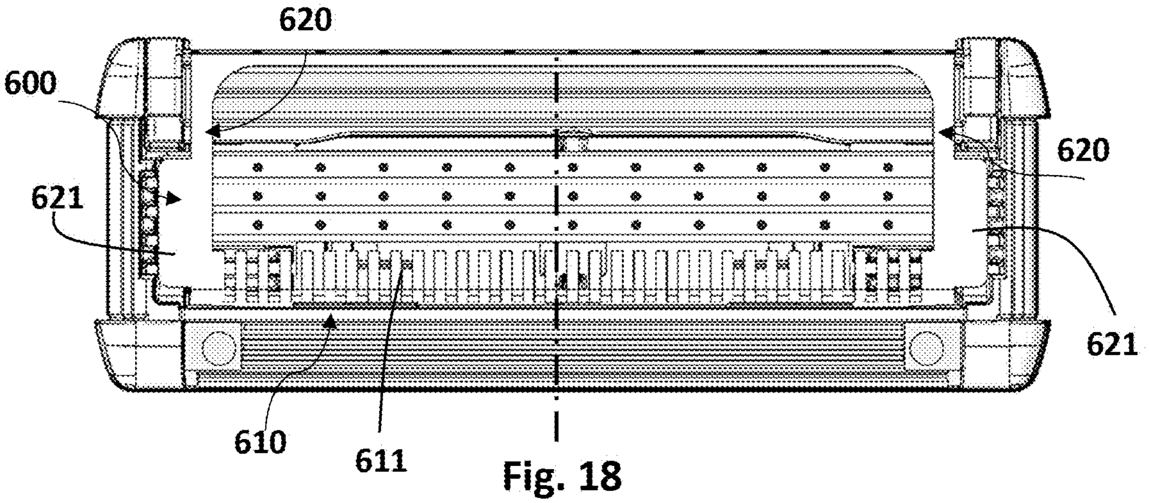
FIG. 18 shows a shaving head comprising the actuator member of FIGS. 16-17.

FIGS. 16 to 18 show another variation of the actuator member described above. FIG. 16 shows a top view of an actuator member with a cantilever member with side extensions and a pressure sensor element with long comb teeth. The long comb teeth allow for more interaction with the skin terrain anomalies and may thus respond quicker and/or for a longer time. FIG. 17 shows a cross-section of the actuator member of FIG. 16 along the dashed line indicated in FIG. 16. As can be seen, the long comb teeth increase the surface area of the pressure sensor element and may thus provide a quicker response to skin anomalies. Longer comb teeth may also better sort hair to be cut. Longer comb teeth may also allow longer hairs be raised from the skin surface before meeting the edge of the first cutting member, and thus facilitating more efficient and close shave result. FIG. 18 shows a shaving head comprising the actuator member of FIG. 16-17. Of course, the width of the comb teeth is only illustrator and the width and length of the comb teeth may be adjusted to the specific needs.

Figure 10A:
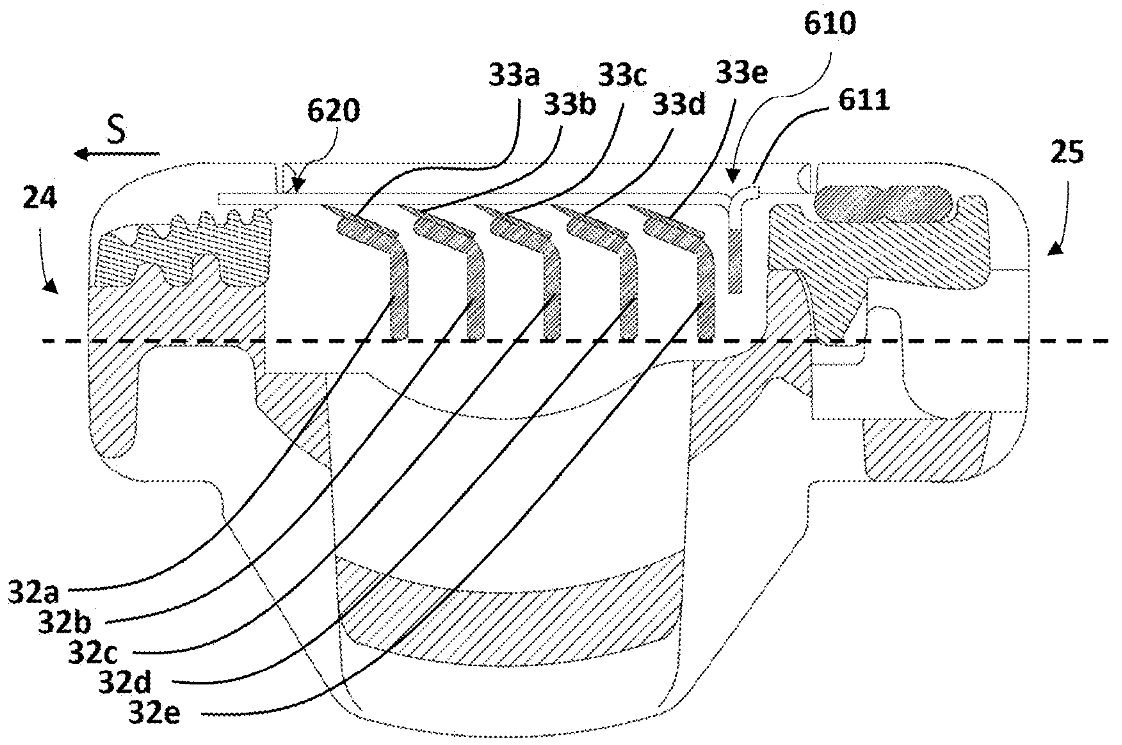
FIGS. 10*a-b* show a shaving head comprising an actuator member in accordance with the present disclosure without and with a force acting on the actuator member, the pressure sensor element of the actuator member being positioned towards a trailing longitudinal side of the shaving head.
Figure 10B:
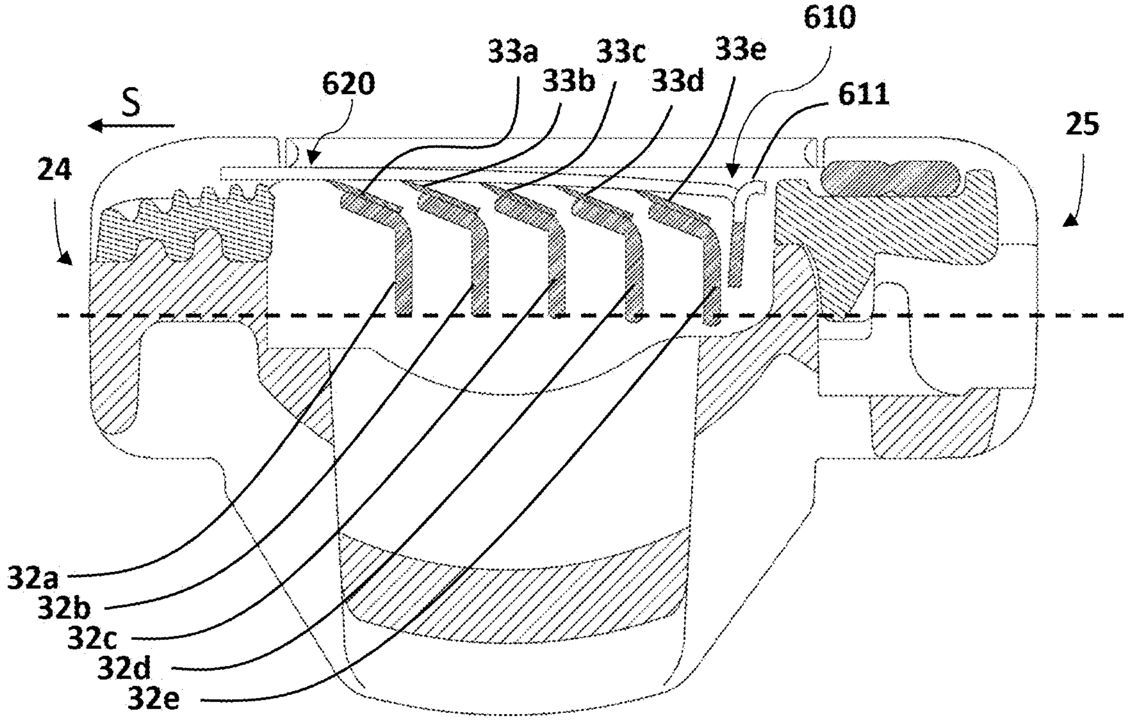

FIGS. 10*a-b* show a shaving head comprising an actuator member in accordance with the present disclosure without and with a force acting on the actuator member. All features mentioned above with respect to FIGS. 1 to 9 are compatible and combinable with the example of FIGS. 10*a-b*. Especially the features which may be identical or similar will not be described again.

The actuator member 600 of FIGS. 10*a-b* is positioned such that the one or more cantilever elements 620 are positioned proximate to the leading longitudinal side 24 of the frame 21 and one or more pressure sensor elements 610 are positioned proximate to the trailing longitudinal side 25 of the frame 21. In the example of FIG. 10*a-b* the arrangement of the actuator member 600 in essence mirrors the arrangement shown and described in context with the example of FIGS. 3*a-b*. Whereas in FIGS. 3*a-b*, the pressure sensor element is positioned towards a leading end, it is positioned in FIGS. 10*a-b* towards a trailing end. All features mentioned above are thus directly applicable for the example of FIGS. 10*a-b*. For example, the (direct/indirect) connection of the cantilever element 620 to the frame and/or to the cutting members, the cantilever element 620 contacting/connecting to one or more cutting members, the (direct/indirect) connection with the pressure sensor element 610, etc. Reference is made to the above description for further details.

As can be seen in FIG. 10*b*, actuating the actuator member 600 may result in the one or more cutting members having a decreased exposure relative to the shaving plane. The cantilever element 620 may progressively decrease the exposure of the cutting members relative to the shaving plane seen from a leading longitudinal end 24 of the frame to a trailing longitudinal end 25 of the frame.

Figure 11A:
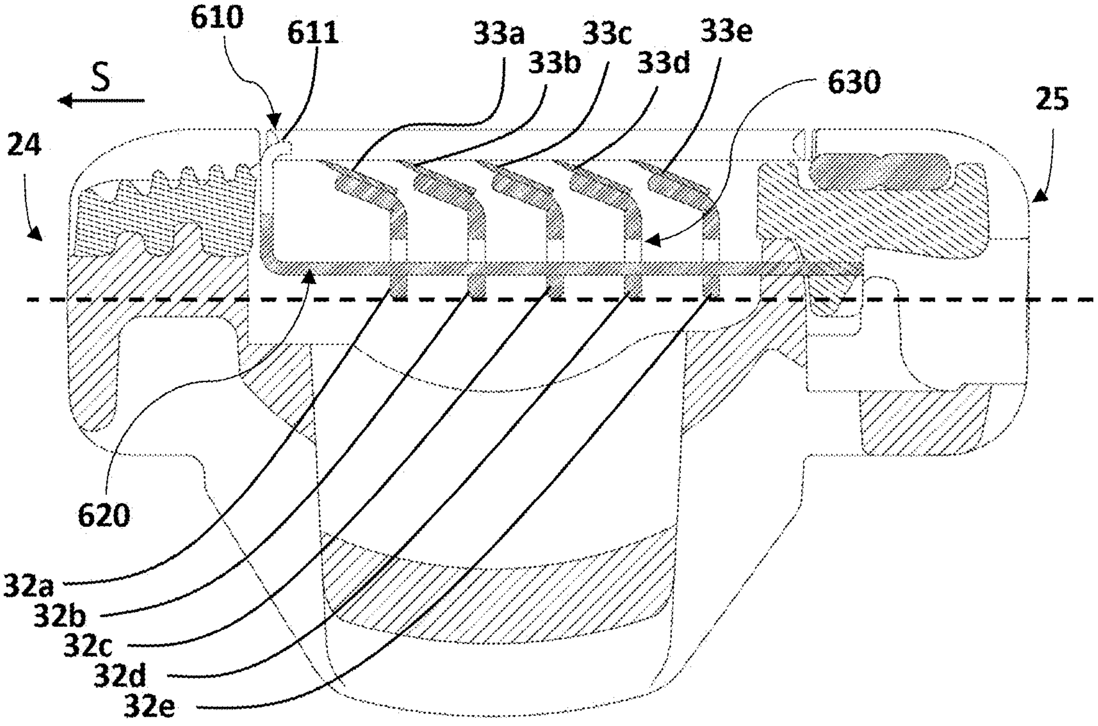
FIGS. 11*a-b* show a shaving head comprising an actuator member in accordance with the present disclosure without and with a force acting on the actuator member, the cantilever member extending through apertures in the cutting members.
Figure 11B:
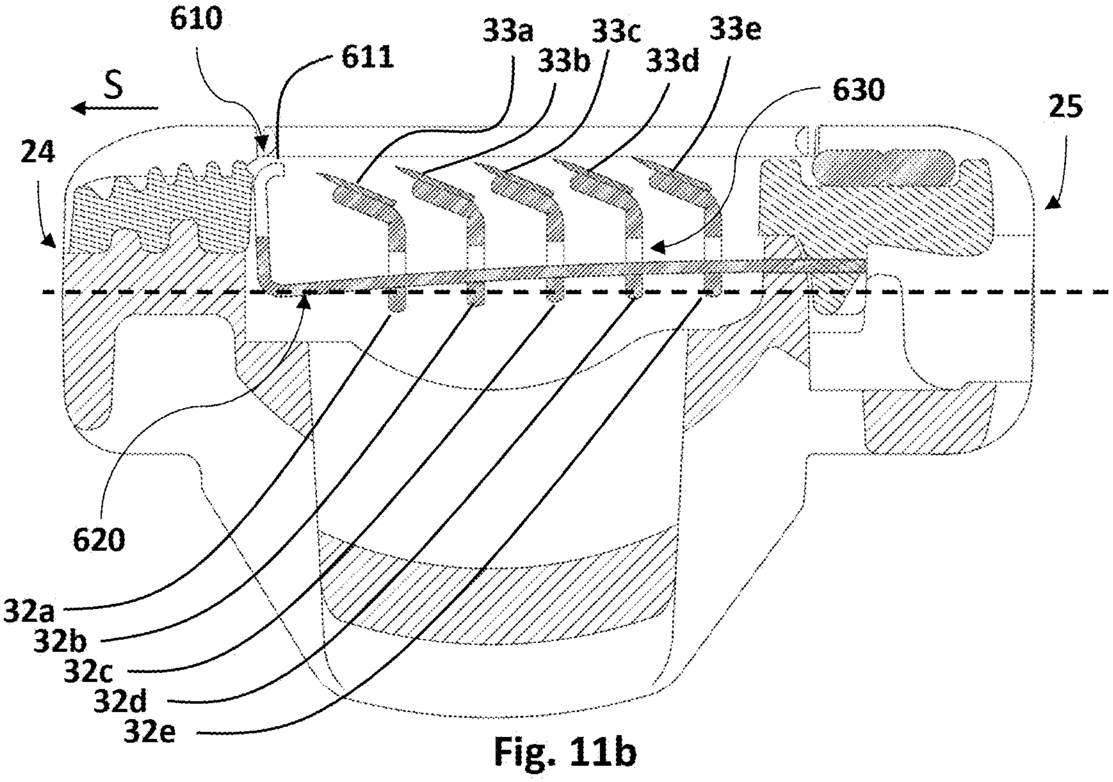

FIGS. 11-12 show a shaving head comprising an actuator member in accordance with the present disclosure without and with a force acting on the actuator member. As discussed above, the one or more of the cutting members may comprise one or more apertures 630 and the cantilever element 620 may extend through at least one of the apertures 630. The one or more apertures 630 of a cutting member may be in the blade support 32*a-e* of the cutting member. Shown in FIGS. 11-12 is that one or more cutting members comprise apertures 630, which extend through the blade supports 32*a-e*. The cantilever element 620 extends through the apertures 630. As the cantilever members are configured to contact the cutting members (or are connected to these), a force may be transferred from the cantilever element 620 to the cutting members in order to reduce an exposure of the cutting members relative to a shaving plane. FIG. 11*a* shows the “at rest” condition with no load applied on the pressure sensor element 610. FIG. 11*b* shows that a force exerted on the pressure sensor element bends the cantilever element 620 such that the exposure of cutting members is progressively decreased relative to the shaving plane, thereby reducing the risk of skin irritations.

Figure 12A:
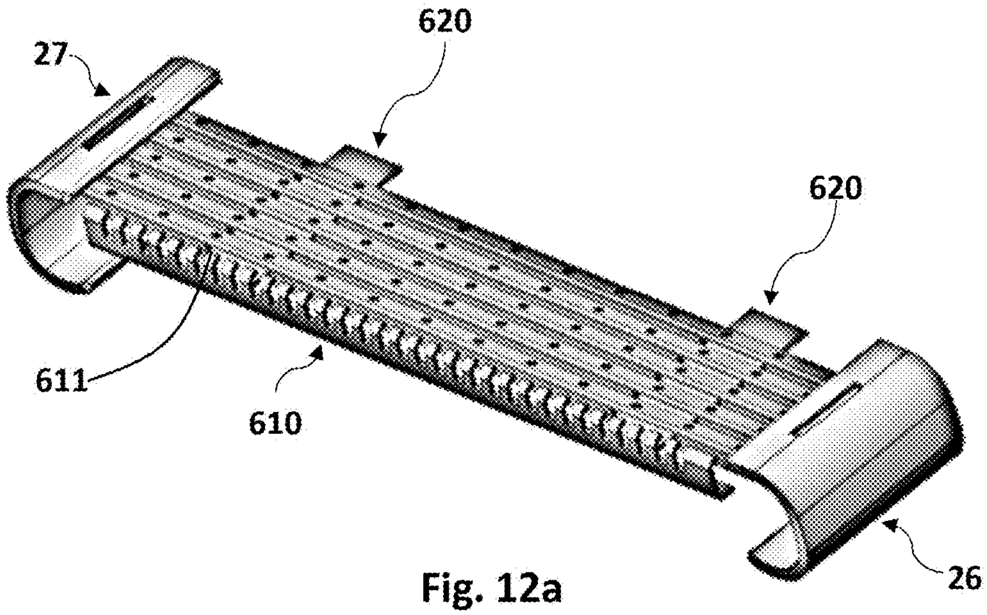
FIGS. 12*a-b* show an isometric view of an actuator member and cutting members in accordance with the present disclosure, the cantilever member extending through apertures in the cutting members.
Figure 12B:
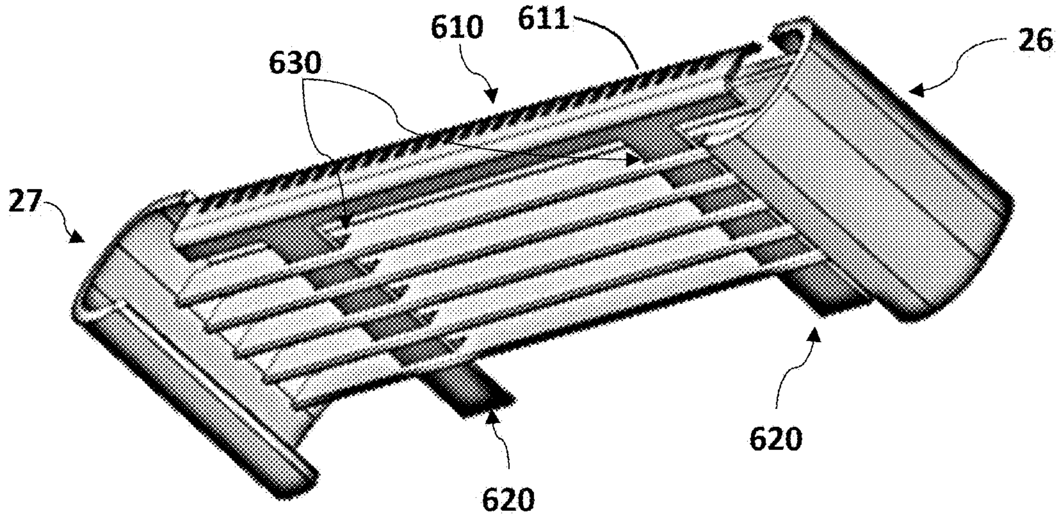

FIGS. 12*a-b* show an isometric view of an actuator member and cutting members of FIG. 11*a-b*. The cantilever members 620 extend through apertures 630 in the cutting members. FIG. 12 illustrates two cantilever members 620, which are positioned inwardly relative to the side edges of the pressure sensing element 610. Examples of retainers 26 and 27 are also shown in FIG. 12*a-b*. As discussed above, the one or more cutting members may also be secured by other fasteners into the frame, e.g. by the cantilever members 620.

In any of the foregoing embodiments, the actuator member may comprise aluminum, in particular wherein one or more of the cantilever elements comprises aluminum. Aluminum may in circumstances be a desired material as it can act as a sacrificial element via the cathodic protection mechanism and thereby improve corrosion resistance of the cutting member (which could e.g. comprise stainless steel). The actuator member may comprise an elastic material, in particular a metallic and/or a polymeric and/or composite material. The actuator member may be coated with antifriction materials to improve shaving performance. In addition, or, alternatively, the actuator member may be colored to enhance product aesthetics. In any of the embodiments described herein, the actuator member may be non-permanently attached to the guard. The actuator member may also be a detachable component.

The shaving head may comprise a plurality of actuator members. One or more of the cutting members may be positioned in a blade receiving section of the frame. One or more of the cutting members may be positioned on resilient fingers. One or more of the cutting members may be retained by retainers. One or more of the cutting members may comprise a blade and a blade support.

The present disclosure also provides a method of manufacturing a shaving head comprising, in any order, one or more of the following steps. Obtaining a frame, one or more cutting members and an actuator member. Disposing the one or more cutting members between a leading longitudinal side and a trailing longitudinal side of the frame such that one or more of the cutting members are movable in a direction orthogonal to a shaving plane. Disposing an actuator member in the frame such that it is configured to retract one or more of the cutting members in response to a pressure exerted on the actuator member. The actuator member may comprise a pressure sensor element and a cantilever element. Any of the aforementioned elements may in addition be assembled to the shaving head.

The present disclosure also provides a shaving razor assembly comprising a razor handle and a shaving head in accordance with any of the embodiments summarized above. The shaving head may either releasably attached to the razor handle via a pivotable or non-pivotable connection, integrally formed with the razor handle via a non-pivotable connection, or integrally formed with the razor handle via a pivotable connection.

The present disclosure also provides a kit of parts comprising a razor handle a shaving head holder comprising a plurality of shaving heads according to any of the embodiments summarized above.

Although the present invention has been described above and is defined in the attached claims, it should be understood that the invention may alternatively be defined in accordance with the following embodiments:

1. A shaving head (20) comprising a frame (21) and one or more cutting members (28*a-d*) arranged between a leading longitudinal side (24) and a trailing longitudinal side (25) of the frame (21), wherein one or more of the cutting members (28*a-d*) are movable in a direction orthogonal to a shaving plane;

characterized by an actuator member (600), which is configured retract one or more cutting members relative to the shaving plane (28*a-d*) in response to a pressure exerted on the actuator member (600).

2. The shaving head of embodiment 1, wherein the actuator member (600) comprises a pressure sensor element (610).
3. The shaving head of embodiment 2, wherein the pressure sensor element (610) comprises one or more comb teeth (611).
4. The shaving head of embodiment 3, wherein the pressure sensor element (610) extends above the shaving plane in an "at-rest" condition without any force acting on the actuator member (600), in particular wherein the pressure sensor element (610) extends about 0.05 mm to about 3.0 mm, in particular about 0.05 mm to about 1.0 mm, more particularly about 0.05 mm to about 0.3 mm above the shaving plane.
5. The shaving head of any of the embodiments 1-3, wherein the pressure sensor element (610) is substantially at the same level with the shaving plane in an "at-rest" condition without any force acting on the actuator member (600).
6. The shaving head of any of embodiments 2-5, wherein the pressure sensor element (610) of the actuator member (600) is elastically supported in the shaving head (20).
7. The shaving head of any of embodiments 2-6, wherein the pressure sensor element (610) is a longitudinal element having a continuous geometry in the longitudinal direction.
8. The shaving head of any of embodiments 2-6, wherein the pressure sensor element (610) is a longitudinal element comprising a comb-like geometry in the longitudinal direction.
9. The shaving head of any of embodiments 2-8, wherein the pressure sensor element (610) is a non-cutting element.
10. The shaving head of any of embodiments 2-8, wherein the pressure sensor element (610) is one of the one or more cutting members (28*a-d*).
11. The shaving head of any of embodiments 2-10, wherein the pressure sensor element (610) is arranged between the leading longitudinal side (24) of the frame (21) and one or more of the cutting members (28*a-d*), in particular between the leading longitudinal side (24) of the frame (21) and the leading cutting member (28*a*).
12. The shaving head of any of embodiments 2-10, wherein the pressure sensor element (610) is arranged between the trailing longitudinal side (25) of the frame (21) and one or more of the cutting members (28*a-d*), in particular between the trailing longitudinal side of the frame (21) and the trailing cutting member (28*d*).
13. The shaving head of any of embodiments 2-12, wherein the pressure sensor element is configured to generate a force for decreasing the exposure of one or more of the cutting members (28*a-d*).
14. The shaving head of any of embodiments 2-13, wherein the shaving head (20) comprises two or more pressure sensor elements (610).
15. The shaving head of any of embodiments 2-14, wherein the actuator member (600) comprises one or more cantilever elements (620), which are configured to transmit a force from the pressure sensor element (610) to one or more of the cutting members (28*a-d*).
16. The shaving head of embodiment 15, wherein the one or more cantilever elements (620) are connected to the pressure sensor element (610).
17. The shaving head of embodiment 15-16, wherein each of the cutting members (28*a-d*) comprises a blade (33*a-e*) or a blade (33*a-e*) and a blade support (32*a-d*), wherein the one or more cantilever elements (620) contact the blades (33*a-e*) and/or the blade supports (32*a-d*).
18. The shaving head of embodiment 17, wherein at least one of the one or more cutting members (28*a-d*) comprises one or more apertures (630), wherein at least one of the cantilever elements (620) extends through at least one of the apertures (630).
19. The shaving head of embodiment 18, wherein the one or more apertures (630) of a cutting member (28*a-d*) are in the blade support (32*a-d*) of the cutting member (28*a-d*) or in the blade (33*a-d*) of the cutting member (28*a-d*).
20. The shaving head of any of embodiments 15-19, wherein one or more of the cantilever elements (620) is connected to one or more of the cutting members (28*a-d*).
21. The shaving head of any of embodiments 15-20, wherein one or more of the cantilever elements (620) is connected to the frame (21).
22. The shaving head of embodiment 21, wherein one or more cantilever elements (620) is connected to the frame (21) at a position proximate to the leading longitudinal side (24) of the frame (21) or at a position proximate to the trailing longitudinal side (25) of the frame (21).
23. The shaving head of embodiment 22, wherein one or more cantilever elements (620) are connected proximate to the trailing longitudinal side (25) of the frame (21) and one or more pressure sensor elements (610) are positioned proximate to the leading longitudinal side (24) of the frame (21).
24. The shaving head of embodiment 22, wherein one or more cantilever elements (620) are connected proximate to the leading longitudinal side (24) of the frame (21) and one or more pressure sensor elements (610) are positioned proximate to the trailing longitudinal side (25) of the frame (21).
25. The shaving head of any of embodiments 15-24, wherein the one or more cantilever elements (620) elastically support the pressure sensor element (610) in the shaving head (20).
26. The shaving head of any of embodiments 15-25, wherein one or more of the cutting members (28*a-d*) are retained by one or more cantilever elements (620).
27. The shaving head of any of embodiments 15-26, wherein one or more cantilever elements (620) comprise side extensions (621).
28. The shaving head of embodiment 27, wherein one or more cantilever elements (620) are secured to the frame (21) by or with the side extensions (621) of the cantilever element (620).
29. The shaving head of embodiment 27 or 28, wherein the side extensions (621) of the one or more cantilever elements (620) are secured by clips or retainers (26, 27) to the frame.
30. The shaving head of embodiment 29, wherein the side extensions (621) of the one or more cantilever elements (620) itself function as clips or retainers (26, 27) for securing the actuator member (600) to the frame (21).
31. The shaving head of any of embodiments, wherein the actuator member (600) comprises aluminum, in particular wherein one or more of the cantilever elements (620) comprises aluminum.
32. The shaving head of any of the preceding embodiments, wherein the actuator member (600) is configured to produce progressively increasing or progressively decreasing exposures of the cutting edges (30*a-d*) of a plurality of cutting members (28*a-d*).

33. The shaving head of any of the preceding embodiments, wherein the actuator member (600) is configured to bend one or more of the cutting members (28*a-d*).

34. The shaving head of any of the preceding embodiments, wherein the actuator member (600) comprises an elastic material, in particular a metallic and/or a polymeric and/or composite material.

35. The shaving head of any of the preceding embodiments, wherein the shaving head (20) comprises a plurality of actuator members (600).

36. The shaving head of any of the preceding embodiments, wherein one or more of the cutting members (28*a-d*) are positioned in a blade receiving section (31*a-d*) of the frame.

37. The shaving head of any of the preceding embodiments, wherein one or more of the cutting members (28*a-d*) are positioned on resilient fingers (38*a-d*).

38. The shaving head of any of the preceding embodiments, wherein one or more of the cutting members (28*a-d*) are retained by retainers (26, 27).

39. The shaving head of any of the preceding embodiments, wherein one or more of the cutting members (28*a-d*) comprise a blade (33*a-e*) and a blade support (32*a-d*).

40. A method of manufacturing a shaving head (20) comprising:
 - obtaining a frame (21), one or more cutting members (28*a-d*) and an actuator member (600);
 - disposing the one or more cutting members (28*a-d*) between a leading longitudinal side (24) and a trailing longitudinal side (25) of the frame (21) such that one or more of the cutting members (28*a-d*) are movable in a direction orthogonal to a shaving plane;
 - disposing the actuator member (600) in the frame (21) such that it is configured to retract one or more cutting members relative to the shaving plane in response to a pressure exerted on the actuator member.

41. The method of embodiment 40, wherein the actuator member (600) comprises a pressure sensor element (610) and a cantilever element (620).

42. A shaving razor assembly comprising:
 - a razor handle (2);
 - a shaving head (20) according to any of embodiments 1 to 39, wherein the shaving head (20) is either releasably attached to the razor handle (2) via a pivotable (8) or non-pivotable connection, integrally formed with the razor handle (2) via a non-pivotable connection, or integrally formed with the razor handle (2) via a pivotable connection (8).

43. A kit of parts comprising:
 - a razor handle (2);
 - a shaving head holder comprising a plurality of shaving heads (20) according to any of embodiments 1 to 39.

LIST OF REFERENCE NUMERALS USED IN THE DRAWINGS

| | |
|---|---|
| S | Shaving direction |
| 1 | Shaving razor assembly |
| 2 | Handle |
| 4 | proximal portions |
| 5a, 5b | release mechanism |
| 6 | distal portion |
| 8 | pivotable bearing member |

-continued

| | |
|---|---|
| 16 | first side portion |
| 18 | second side portion |
| 20 | shaving head |
| 21 | frame |
| 22 | platform member |
| 23 | guard member |
| 24 | leading longitudinal side |
| 25 | trailing longitudinal side |
| 26 | first retainer |
| 27 | second retainer |
| 28a-d | cutting member |
| 29 | group of cutting members |
| 30a-d | cutting edge |
| 31 | blade receiving section |
| 32a-d | blade support |
| 33a-d | blade |
| 34a-d | holding slots |
| 35 | cross member |
| 36 | blade support guide |
| 38a-d | resilient finger |
| 49 | trailing assembly |
| 50 | skin care element |
| 52 | retractable cover |
| 53 | trimming blade |
| 54 | trimming blade support |
| 55 | leading wall of blade receiving section 31 |
| 56 | trailing wall of blade receiving section 31 |
| 600 | actuator member |
| 610 | pressure sensor element |
| 611 | comb teeth |
| 620 | cantilever element |
| 621 | side extensions of cantilever elements |
| 630 | apertures in cutting members |

The invention claimed is:

1. A shaving head comprising a frame and one or more cutting members arranged between a leading longitudinal side and a trailing longitudinal side of the frame, wherein the one or more cutting members are movable in a direction orthogonal to a shaving plane, wherein each of the one or more cutting members extend between a cutting end closest to the shaving plane and a base end farthest from the shaving plane, wherein the one or more cutting members includes a first cutting member and other cutting members, and wherein the first cutting member is closer to the leading longitudinal side than any of the other cutting members;
 - wherein the shaving head further comprises a cantilever extending directly from the frame, wherein the cantilever consists of one cantilever configured to exert force on each of the one or more cutting members, wherein the cantilever is configured to retract at least one of the one or more cutting members such that the base end of at least the first cutting member moves away from the shaving plane in response to a pressure exerted on the cantilever, wherein the cantilever extends directly from the frame at a position closer to the trailing longitudinal side than any of the one or more cutting members towards the leading longitudinal side such that the cantilever extends past each of the one or more cutting members, wherein the cantilever terminates closer to the leading longitudinal side than the first cutting member, and wherein the cantilever terminates closer to the base end of the first cutting member than the cutting end of the first cutting member.

2. The shaving head of claim 1, wherein the cantilever comprises one or more comb teeth.

3. The shaving head of claim 2, wherein the one or more comb teeth extend above the shaving plane in an at-rest condition without any force acting on the cantilever, wherein the one or more comb teeth extend in a range from 0.05 mm to 3.0 mm above the shaving plane.

4. The shaving head of claim 1, wherein the cantilever is elastically supported in the shaving head.

5. The shaving head of claim 1, wherein at least one of the one or more cutting members comprises a blade and a blade support, wherein the cantilever is connected to or is configured to contact the blade and/or the blade support.

6. The shaving head of claim 1, wherein at least one of the one or more cutting members comprises one or more apertures, wherein the cantilever extends through at least one of the one or more apertures.

7. The shaving head of claim 6, wherein the one or more apertures of a cutting member are in a blade support of the cutting member or in a blade of the cutting member.

8. The shaving head of claim 1, wherein at least one of the one or more cutting members is retained by the cantilever.

9. The shaving head of claim 1, wherein the cantilever is configured to produce progressively increasing or progressively decreasing exposures of cutting edges of a plurality of cutting members.

10. A method of manufacturing a shaving head comprising:

disposing one or more cutting members on a frame, wherein the one or more cutting members are between a leading longitudinal side and a trailing longitudinal side of the frame such that the one or more cutting members are movable in a direction orthogonal to a shaving plane, wherein each of the one or more cutting members extend between a cutting end closest to the shaving plane and a base end farthest from the shaving plane, wherein the one or more cutting members include a first cutting member and other cutting members, and wherein the first cutting member is closer to the leading longitudinal side than any of the other cutting members; and disposing a cantilever in and extending directly from the frame, wherein the cantilever consists of one cantilever configured to exert force on each of the one or more cutting members, wherein the cantilever is configured to decrease exposure of at least one of the one or more cutting members relative to the shaving plane in response to a pressure exerted on the cantilever such that the base end of at least the first cutting member moves away from the shaving plane, wherein the cantilever extends directly from the frame at a position closer to the trailing longitudinal side than any of the one or more cutting members towards the leading longitudinal side such that the cantilever extends past each of the one or more cutting members, wherein the cantilever terminates closer to the leading longitudinal side than the first cutting member, and wherein the cantilever terminates closer to the base end of the first cutting member than the cutting end of the first cutting member.

11. A shaving razor assembly comprising:

a razor handle; and a shaving head according to claim 1, wherein the shaving head is either releasably attached to the razor handle via a pivotable or non-pivotable connection, integrally formed with the razor handle via a non-pivotable connection, or integrally formed with the razor handle via a pivotable connection.

12. The shaving head of claim 1, wherein the cantilever is secured to the frame by or with side extensions of the cantilever, and wherein the side extensions of the cantilever secure the one or more cutting members in a housing of the shaving head.

13. A shaving head, comprising:

a frame;

one or more cutting members arranged between a leading longitudinal side and a trailing longitudinal side of the frame, wherein the one or more cutting members are movable in a direction orthogonal to a shaving plane, wherein each of the one or more cutting members extend between a cutting end closest to the shaving plane and a base end farthest from the shaving plane, wherein the one or more cutting members includes a first cutting member and other cutting members, and wherein the first cutting member is closer to the leading longitudinal side than any of the other cutting members; and a cantilever including a plurality of comb-like teeth, wherein the cantilever consists of one cantilever configured to secure the one or more cutting members between the leading longitudinal side and the trailing longitudinal side of the frame and exert force on each of the one or more cutting members, wherein the cantilever extends directly from the frame, wherein the cantilever is configured to retract at least one of the one or more cutting members such that the base end of at least the first cutting member moves away from the shaving plane in response to a pressure exerted on the cantilever, wherein the cantilever extends directly from the frame at a position closer to the trailing longitudinal side than any of the one or more cutting members towards the leading longitudinal side such that the cantilever extends past each of the one or more cutting members, wherein the cantilever terminates closer to the leading longitudinal side than the first cutting member, and wherein the cantilever terminates closer to the base end of the first cutting member than the cutting end of the first cutting member.

14. The shaving head of claim 1, wherein the one or more cutting members further includes a last cutting member, wherein the last cutting member is closer to the trailing longitudinal side than the first cutting member or any of the other cutting members, and wherein the base end of the first cutting member is farther from the shaving plane than the base end of the last cutting member when the cantilever retracts the one or more cutting members.

15. The shaving head of claim 1, wherein the cantilever is detachable, and wherein the cantilever is separate to the one or more cutting members.

16. The shaving head of claim 1 further comprising one or more blade support guides positioned between the one or more cutting members, wherein each of the one or more blade support guides contacts at least two of the one or more cutting members.

* * * * *